United States Patent [19]

Ohmori

[11] Patent Number: 5,737,639

[45] Date of Patent: Apr. 7, 1998

[54] METHOD AND APPARATUS FOR THE RECORDING AND REPRODUCING OF DATA ON A STORAGE MEDIUM

[75] Inventor: Takashi Ohmori, Tokyo, Japan

[73] Assignee: Sony Corporation, Tokyo, Japan

[21] Appl. No.: 694,607

[22] Filed: Aug. 9, 1996

Related U.S. Application Data

[62] Division of Ser. No. 196,469, Feb. 15, 1994.

[30] Foreign Application Priority Data

Feb. 26, 1993 [JP] Japan .................................. 5-062992
Feb. 26, 1993 [JP] Japan .................................. 5-062993

[51] Int. Cl.⁶ .................................................. G11B 13/04
[52] U.S. Cl. ........................ 395/893; 369/13; 369/124; 369/275.3; 395/404; 395/427
[58] Field of Search ............................ 395/600, 893, 395/892, 882, 821, 404, 427; 369/13, 124, 278.3

[56] References Cited

U.S. PATENT DOCUMENTS

| | | | |
|---|---|---|---|
| 5,245,600 | 9/1993 | Yamauchi et al. | 369/49 |
| 5,291,462 | 3/1994 | Richards | 369/13 |
| 5,315,570 | 5/1994 | Miura et al. | 369/48 |
| 5,388,093 | 2/1995 | Yoshida et al. | 369/124 |
| 5,414,834 | 5/1995 | Alexander | 395/600 |
| 5,440,529 | 8/1995 | Takaxawa et al. | 369/13 |
| 5,469,272 | 11/1995 | Kubota et al. | 358/335 |
| 5,477,525 | 12/1995 | Okabe | 369/275.3 |
| 5,491,592 | 2/1996 | Aramaki et al. | 360/59 |
| 5,555,098 | 9/1996 | Parulski | 358/341 |

*Primary Examiner*—Christopher B. Shin
*Attorney, Agent, or Firm*—William S. Frommer; Alvin Sinderbrand

[57] ABSTRACT

A recording medium has a user recordable area in which two types of information may be recorded, such as audio data and user data, and a control area having a first area for management information regarding the first type of information and a second area for management information regarding the second type of information. A reproducing apparatus uses the first management information to reproduce the first type of information and to avoid reproducing the second type of information as the first type of information, and uses the second management information to reproduce the second type of information and to avoid reproducing the first type of information as the second type of information. A recording apparatus generates the first management information when the first type of information is recorded and generates the second management information when the second type of information is recorded.

36 Claims, 22 Drawing Sheets

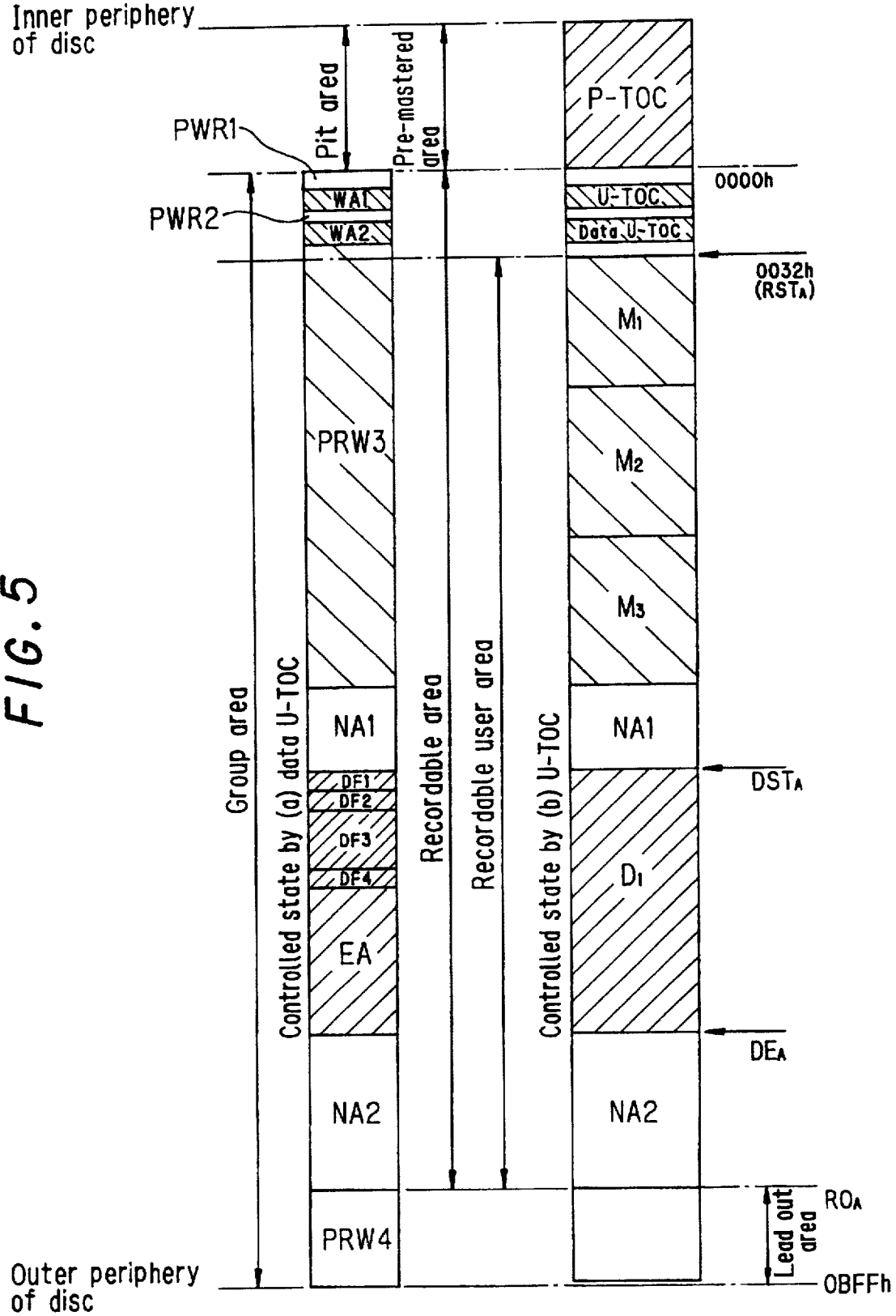

FIG. 6

| 16bit | | 16bit | | |
|---|---|---|---|---|
| MSB　　　LSB | MSB　　　LSB | MSB　　　LSB | MSB　　　LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| 11111111 | 11111111 | 00000000 | 00000010 | 3 |
| Cluster H | Cluster L | 00000000 | 00000000 | 4 |
| 00000000 | 00000000 | 00000000 | 00000000 | 5 |
| 00000000 | 00000000 | 00000000 | 00000000 | 6 |
| "M" | "I" | "N" | "I" | |
| Disc type | Rec power | First TNO | Last TNO | 7 |
| Read out start address (RO$_A$) | | | Used Sectors | 8 |
| Power CAL area start address (PC$_A$) | | | 00000000 | 9 |
| U-TOC start address (UST$_A$) | | | 00000000 | 10 |
| Recordable user area start address (RST$_A$) | | | 00000000 | 11 |
| 00000000 | P-TNO1 | P-TNO2 | P-TNO3 | 12 |
| P-TNO4 | P-TNO5 | P-TNO6 | P-TNO7 | 13 |
| P-TNO248 | P-TNO249 | P-TNO250 | P-TNO251 | 74 |
| P-TNO252 | P-TNO253 | P-TNO254 | P-TNO255 | 75 |
| 00000000 | 00000000 | 00000000 | 00000000 | 76 |
| 00000000 | 00000000 | 00000000 | 00000000 | 77 |
| (01h) Start address | | | Track mode | 78 |
| End address | | | 00000000 | 79 |
| (02h) Start address | | | Track mode | 80 |
| End address | | | 00000000 | 81 |
| (03h) Start address | | | Track mode | 82 |
| End address | | | 00000000 | 83 |
| (FCh) Start address | | | Track mode | 500 |
| End address | | | 00000000 | 501 |
| (FDh) Start address | | | Track mode | 502 |
| End address | | | 00000000 | 503 |
| (FEh) Start address | | | Track mode | 504 |
| End address | | | 00000000 | 505 |
| (FFh) Start address | | | Track mode | 506 |
| End address | | | 00000000 | 587 |

- Header: rows 0–11
- Corresponding table indicating data section: rows 12–77
- Management table section (255 parts table): rows 78–587

P-TOC Sector 0

FIG. 7

| | 16bit | | 16bit | | |
|---|---|---|---|---|---|
| | MSB    LSB | MSB    LSB | MSB    LSB | MSB    LSB | |
| Header | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No. | 10 |
| Corresponding table indicating data section | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| Management table section (255 parts table) (01h) | Start address | | | Track mode | 78 |
| | End address | | | Link information | 79 |
| (02h) | Start address | | | Track mode | 80 |
| | End address | | | Link information | 81 |
| (03h) | Start address | | | Track mode | 82 |
| | End address | | | Link information | 83 |
| (FCh) | Start address | | | Track mode | 500 |
| | End address | | | Link information | 501 |
| (FDh) | Start address | | | Track mode | 502 |
| | End address | | | Link information | 503 |
| (FEh) | Start address | | | Track mode | 504 |
| | End address | | | Link information | 505 |
| (FFh) | Start address | | | Track mode | 506 |
| | End address | | | Link information | 587 |

Audio U-TOC Sector 0

FIG. 9

| (Sector No.) | | (Sector No.) | |
|---|---|---|---|
| 00 | CAT0 | 10 | Reserved |
| 01 | CAT1 | 11 | Reserved |
| 02 | CAT2 | 12 | Reserved |
| 03 | Root Directory | 13 | Reserved |
| 04 | Reserved | 14 | Reserved |
| 05 | Reserved | 15 | Reserved |
| 06 | Reserved | 16 | Reserved |
| 07 | Reserved | 17 | Reserved |
| 08 | Reserved | 18 | Reserved |
| 09 | Reserved | 19 | Reserved |
| 0A | Reserved | 1A | Reserved |
| 0B | Reserved | 1B | Reserved |
| 0C | Reserved | 1C | Reserved |
| 0D | Reserved | 1D | Reserved |
| 0E | Reserved | 1E | Reserved |
| 0F | Reserved | 1F | Reserved |

Format of CAT0

Format of CAT1

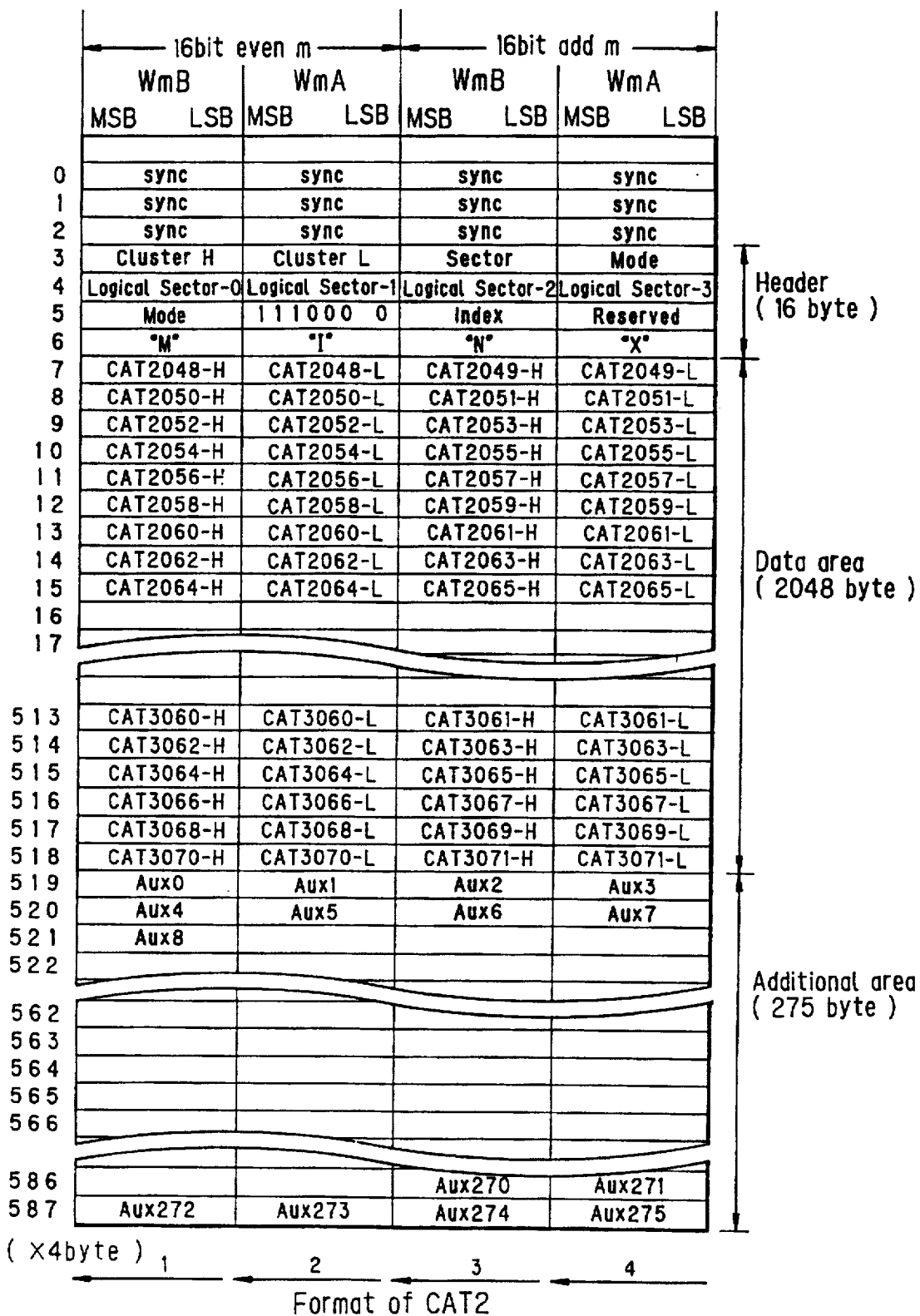

FIG. 13

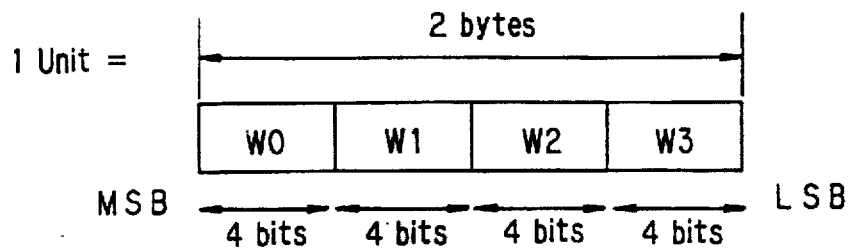

FIG. 14

Definition of word W0

| | | |
|---|---|---|
| W0 | Fh | Recordable empty cluster |
| | Eh | Cluster at ending portion of its file |
| | Dh | Cluster Continued to next cluster |
| | Ch | Cluster at head of file |
| | Bh | Specify a jump to address denoted by $W_1$, $W_2$, $W_3$ |
| | Ah ⟩ 7h | Not defined |
| | 6h | Recording (rewriting) inhibit cluster — Cluster at ending portion of file |
| | 5h | Recording (rewriting) inhibit cluster — Cluster continued to next cluser |
| | 4h | Recording (rewriting) inhibit cluster — Cluster at head of file |
| | 3h | Specify a jump to address denoted by $W_1$, $W_2$, $W_3$ |
| | 2h 1h | Not defined |
| | 0h | Recording/playback inhibit |

Directory Sector Format

Heading Sector Format ( character data )

Heading Sector Format ( dot data )

Sector Structure for Data

Sector Structure for Data, Mode 0

Sector Structure for Data, Mode 1

Sector Structure for Data, Mode 2

METHOD AND APPARATUS FOR THE RECORDING AND REPRODUCING OF DATA ON A STORAGE MEDIUM

This application is a division of application Ser. No. 08/196,469, filed Feb. 15, 1994, pending.

BACKGROUND OF THE INVENTION

The present invention relates to a recording medium, a recording apparatus and a reproducing apparatus therefor. The recording medium is for recording multiple types of data, such as audio data and user data, and has separate management information for each of the data types recorded thereon.

A magneto-optical (MO) recording medium, specifically, a disc, a recording apparatus and a reproducing apparatus therefor have recently become available to consumers for reproduction and recording of audio information, such as audio programs.

This MO disc includes a user recordable area in which audio files can be recorded by the consumer and a management information area for containing data about each of the audio files, such as its contents and starting and ending positions. For content identification, it is sufficient to distinguish the audio files merely by numbers.

The management information in this MO disc can accommodate a relatively small number of audio files, for example, up to 255 audio files. This is appropriate since it is unlikely that a larger number of small audio files, corresponding to, for example, very short programs, will be recorded.

It is desirable that the MO disc be able to record and reproduce additional, non-audio data, referred to herein as user data, for example, character and graphic information, which is not in the format defined for audio data.

For user data, management information is needed in addition to that heretofore used for identifying each data file and its position within the recordable area. For example, a more extensive file naming capability, and attribute information including data describing the user data to an external device are desirable. It is also desirable that the management information structure for user data be able to accommodate a large number of small user data files.

Since the nature of the management information suitable for audio data is different than the nature of the management information suitable for user data, the type of management information defined for the presently available MO disc makes it practically impossible for this MO disc to be used more generally to record and reproduce non-audio data.

In conventional disc media used for recording and/or reproducing user data, such as floppy discs, a data management structure has been adopted in which directory information for data files is spread across the disc. Specifically, a root directory is at a predetermined location. The root directory can include pointers to user data files and to sub-directories, also referred to as child directories. The child directories are recorded in the user recordable area of the disc, interspersed among the user data files. The child directories can include pointers to user data files and to their own sub-directories, which are grandchild directories relative to the root directory. The grandchild directories can include pointers to user data files and to their own sub-directories, which are great-grandchild directories relative to the root directory.

To access a file in a grandchild directory, the reproducing apparatus must first access the root directory, then the child directory, then the grandchild directory, and then the file itself within the grandchild directory. Since the child and grandchild directories may be recorded at varying locations on the disc, multiple disc read operations are often required to access the appropriate directory, which results in a noticeable delay to the user.

OBJECTS AND SUMMARY OF THE INVENTION

Therefore, an object of the present invention is to provide a recording medium, a recording apparatus and a reproducing apparatus for use with the recording medium which avoid the aforementioned disadvantages of the prior art.

It is another object of the present invention to provide a recording medium, recording apparatus and reproducing apparatus which expands a conventional MO disc audio recording and reproducing system so that the MO disc system can also be used to record and/or reproduce non-audio data.

It is a further object of the present invention to expand the conventional MO disc audio recording and reproducing system so that it can be used to record and/or reproduce audio and non-audio data using the same MO disc.

It is yet another object of the present invention to reduce access time for directory information stored on the recording medium.

In accordance with an aspect of this invention, a recording medium has recorded thereon first management information for use with a first type of information that may be recorded on the recording medium, and second management information for use with a second different type of information that may be recorded on the recording medium, the first and second management information being recorded in respectively different areas.

As another aspect of this invention, reproducing apparatus provides for reproducing the first and second management information from the recording medium, and the reproduced first management information is used to recover the first type of information and to prevent the second type of information from being erroneously interpreted as information of the first type. Similarly, the reproduced second management information is used to recover the second type of information and to prevent the first type of information from being erroneously interpreted as information of the second type.

As a further aspect of this invention, recording apparatus is provided for recording the first management information, the second management information and the first and second types of information in first, second and third areas, respectively, on the recording medium, the first management information being generated only when the first type of information is recorded and the second management information being generated only when the second type of information is recorded.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIGS. 3, 4 and 5 are diagrams showing the usage of the recording medium according to the present invention;

FIG. 6 is a diagram showing the P-TOC provided on the recording medium according to the present invention;

FIG. 7 is a diagram showing the U-TOC provided on the recording medium according to the present invention;

FIG. 9 is a diagram used for explaining data U-TOC information;

FIGS. 10, 11 and 12 are diagrams of the CAT0, CAT1 and CAT2 sectors, respectively, of the data U-TOC information;

FIG. 13 is a diagram used for explaining a unit of CAT information;

FIG. 14 is a diagram used for explaining a portion of the unit of CAT information of FIG. 13;

DETAILED DESCRIPTION OF THE PREFERRED EMBODIMENTS

Figure 1:
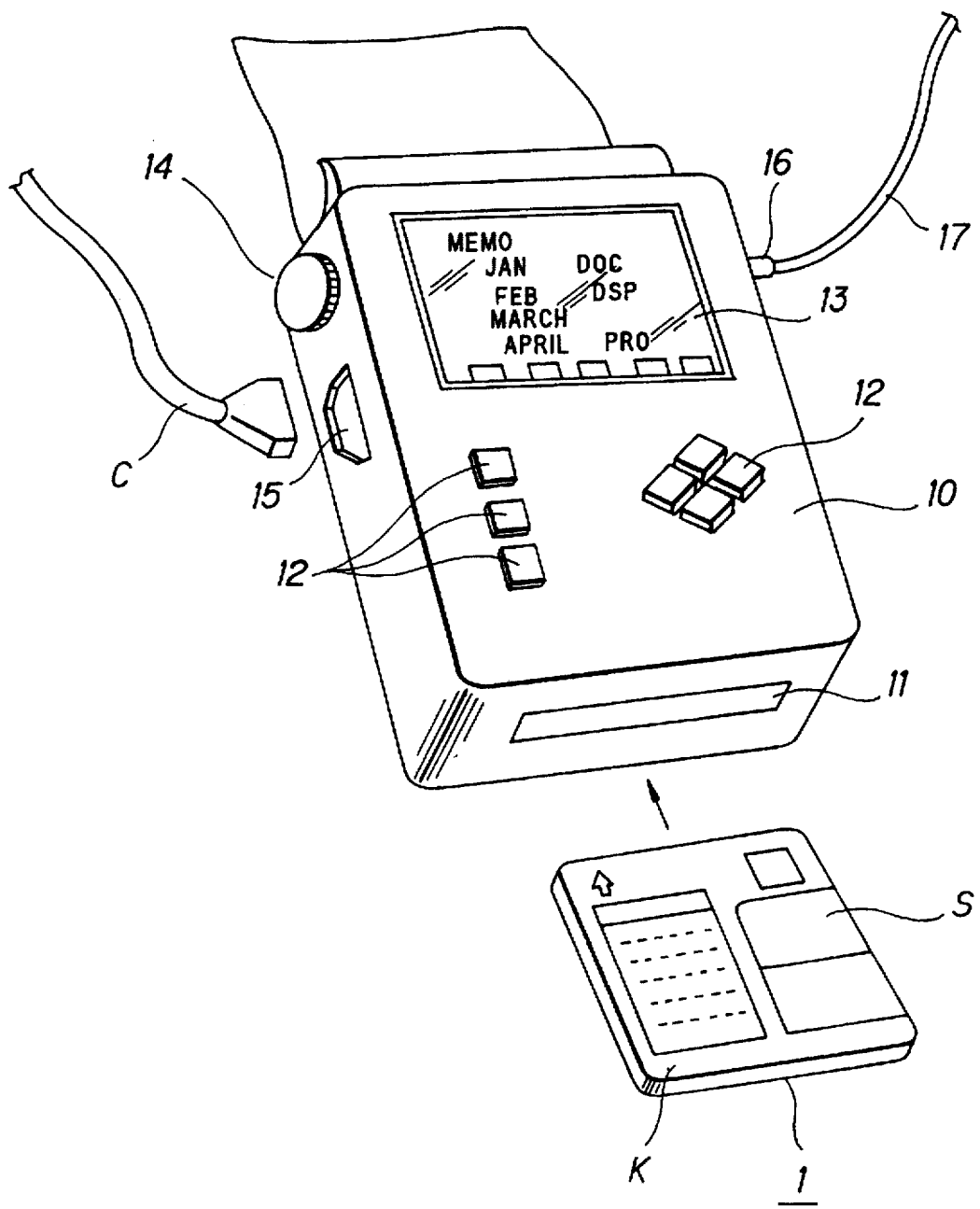
FIG. 1 is an exterior view of a recording medium and a recording and/or reproducing apparatus according to the present invention.

In accordance with the present invention, a recording medium has recorded thereon separate management information for the various types of information expected to be recorded by a user, such as audio data and non-audio data, the non-audio data being referred to herein as user data, for example, character and graphic information. The recording medium may be an MO disc, and thus the utility of the already available MO disc is increased.

By providing separate management information for the various types of information that may be recorded by a user, so-called backward compatibility of the MO disc is achieved with existing apparatus suitable for recording and reproducing only audio information. That is, a recording medium according to the present invention may be used with apparatus expecting a recording medium in the already available audio-only format.

The management information for audio data considers an area used for recording user data to be an unrecordable and unreproducible area. Similarly, the management information for user data considers an area used for recording audio data to be an unrecordable and unreproducible area. Thus, errors in reproduction and erasing due to confusion between types of information are prevented.

The portion of the recordable area which is used for user data is defined within the management information for audio data. This ensures that the user data area is transparent to an audio reproducing apparatus, that is, the audio reproducing apparatus ignores the portion of the recordable area containing the user data even if the audio apparatus is able to detect and operate with only management information for audio data and not with management information for user data. When audio data is recorded, only the management information for audio data needs to be updated, that is, the management information for user data need not be updated. Consequently, a recording apparatus for audio only can be used without any modification or retrofitting whatsoever with a disc according to the present invention. When an audio file is recorded, the management information for audio data can be quickly updated, since changes need not be made to the management information for user data.

When a user data file which exceeds the capacity of the area allocated for user data is to be recorded, the user data area can be extended by appropriately adjusting the boundaries of the user data area defined within the management data for audio data. When the user data file is recorded, the management information for user data is suitably updated.

All of the directory information for the user data files is recorded in the management area for user data files. Since all generations, i.e., parent, child and so on, of directory information for a user data file are usually read during the same disc access, directory access time is reduced relative to conventional directory arrangements.

The management information for user data includes reference information for each user data file, such as a text excerpt for a document file or an image portion or icon for a graphics file. The reference information makes it easier for a user to retrieve a file. Since the reference information is part of the management information which is generally located in one place on the disc, the reference information is immediately available, that is, there is no time penalty resulting from still another disc access. Keyword searches, for example, may be quickly performed on the reference information, even though performing a similar keyword search on the user data files would require an unacceptably long time.

FIG. 1 generally shows an external view of a recording medium 1 and a recording and/or reproducing apparatus 10 according to the present invention.

The recording medium 1 is a MO disc adapted to be stored in a cartridge K having a shutter S which is operative to slide to expose a recording face of the MO disc.

The disc 1 described herein is a MO disc which permits recording of audio and non-audio data and also has an area in which certain management information is optically (read only) pre-recorded. The present invention also contemplates use of an optical, or pre-mastered, disc on which user reproducible information is permanently recorded. The present invention further contemplates use of a hybrid type of disc having a read only area containing optically pre-recorded audio and/or non-audio data, and also having a MO area in which the user may record audio and/or non-audio data.

The recording/reproducing apparatus 10 has a disc inserting section 11 which functions to allow insertion of the cartridge K. The apparatus 10 has an internal mechanism, not shown for ease of illustration, which is adapted to slide open the shutter S when the cartridge K is inserted in the disc inserting section 11.

The apparatus 10 has a key input section 12 adapted to be operated by a user. The key input section 12 may include cursor movement keys, an enter key, data input keys or the like.

The apparatus 10 also has a display section 13 which functions to display information including menu information for retrieving data and the retrieved data.

In one embodiment, the apparatus 10 includes an image scanner section 14 which is adapted to detect image information on a sheet of paper and to convert the image information into graphic data, also referred to as dot data. The apparatus 10 is operative to record image data inputted through the image scanner 14 on the MO disc 1.

Preferably, the apparatus 10 further includes an input/output connector section 15 which functions to transmit and/or receive data to/from other data processing machines, such as computers and word processors, through a communication cable C.

The apparatus 10 may further include a terminal 16 for inputting and/or outputting audio signals from/to other audio apparatus through an audio cable 17.

Figure 2:
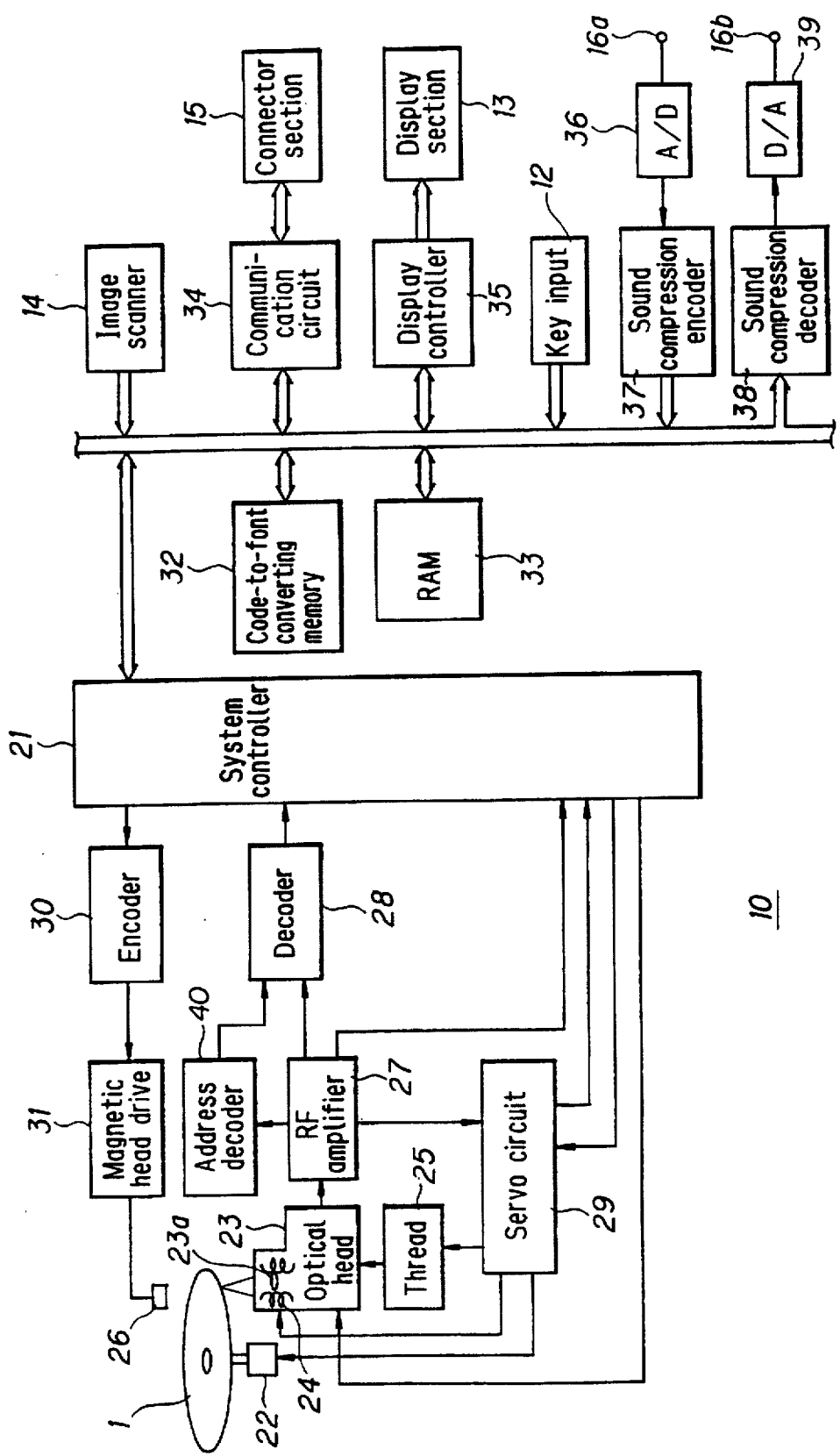
FIG. 2 is a block diagram of the recording and/or reproducing apparatus of FIG. 1.

FIG. 2 shows a functional block diagram of the recording and/or reproducing apparatus 10 having the MO disc 1 loaded therein.

A spindle motor 22 functions to rotate and drive the disc 1 loaded thereon. An optical head 23 is operative to irradiate laser light to the disc 1 during recording and reproduction operations.

During recording, the laser head 23 outputs high level laser light to heat a given spot on the magnetic layer of the recording tracks to a temperature above the Curie temperature, which effectively dissipates the magnetization of the given spot. The disc continues rotation, and once away from the laser beam, the spot begins to cool. A magnetic head 26, disposed on the other side of the disc 1 from the laser 23, is adapted to then apply a magnetic field to the spot to orient it to either north or south polarity, corresponding to the "1" or "0" to be recorded thereon.

During reproduction, the head 23 outputs relatively low level polarized laser light, which is reflected by the disc and processed to form a reproduced signal.

As discussed in detail below, the disc 1 actually has two areas, a pre-mastered playback-only area in which information is recorded as pits in tracks, and a user recordable and reproducible MO area in which information is recorded as magnetized regions in tracks. During manufacturing of the disc, the MO area is provided with grooved tracks, referred to as pre-grooves, which are shifted slightly, or wobbled, to create address information. These pre-grooves enable tracking and spindle servo control during recording and reproducing. When tracking properly, the laser beam spot is centered on the grooved portion of a track.

In the pre-mastered area of the disc, light reflected directly back to the laser indicates the absence of a pit, while in the presence of a pit, the light is diffracted and a lower level is reflected back to the laser. While scanning the pre-mastered regions of the disc 1, the head 23 senses changes of reflected light level caused by the existence of pits.

In the MO area of the disc, upon striking a specific portion of the disc, the polarized light from the laser will be reflected back along one of two opposing directions, with the polarization plane rotating slightly in a forward or reverse direction in accordance with the direction of the magnetic signal, in a phenomenon known as the Kerr effect. The reproduced information can be distinguished by sensing which polarization direction predominates in the reflected light.

To receive the reflected light, an optical system comprising a deflecting beam splitter, an objective lens 23a and the like and a detector for detecting reflected light are mounted on the optical head 23. The objective lens 23a is held by a bi-axial mechanism 24 in a manner capable of altering its orientation in the disc radial direction and in the direction approaching to or separated from the disc. Further, the whole optical head 23 is adapted to be able to move in the disc radial direction by a suitable drive assembly such as thread mechanism 25.

An RF amplifier 27 is adapted to receive a reproduced signal from the optical head 23, to process the supplied information and to extract a reproduced RF signal, tracking error signal, focus error signal, pre-groove information, address information, sub-code information, focus monitor signal and the like. The amplifier 27 functions to supply the thus extracted reproduced RF signal to a decoder section 28, and to supply the pre-groove information to an address decoder 40, which is operative to obtain absolute position information and to supply the absolute position information to the decoder 28. The decoder 28 is operative to supply the absolute position information and the address information (the latter having been recorded as data) to the system controller 21.

The amplifier 27 functions to supply the tracking error signal and focus error signal to a servo circuit 29; and to supply the focus monitor signal to system controller 21. The controller 21 may be a microcomputer and is adapted to supply a track jump command, seek command, rotational velocity sensing information or the like to the servo circuit 29.

The servo circuit 29 is operative to produce various servo drive signals based on the supplied tracking error signal and focus error signal and the information from the system controller 21, to control the bi-axial mechanism 24 and thread mechanism 25 for focussing and tracking, and to control the spindle motor 22 in a constant angular velocity (CAV) or constant linear velocity (CLV) operation.

The decoder 28 is also operative to decode the reproduced RF signal, which may represent user data or audio information, using eight-to-fourteen modulation (EFM) decoding, cross interleave Reed-Solomon code (CIRC) decoding (used in the pre-mastered area of the disc), advanced CIRC (ACIRC) decoding (used in the MO area of the disc) and the like, and to supply a decoded reproduced signal to the system controller 21.

In a complementary manner, during a recording operation, information is supplied from the system controller 21 to an encoder 30, which is operative to encode the information using ACIRC encoding, EFM modulation and the like and to supply the encoded signal to a magnetic head driving circuit 31 which applies the encoded signal to the magnetic head 26. During recording, the system controller 21 is operative to supply a control signal to the optical head 23 that causes the head 23 to output recording level laser light.

During playback, the reproduced signal is supplied from the controller 21 to a conversion memory 32 which functions to convert code data to font data and to process the font data so it can be displayed as character data or the like. A buffer RAM 33 functions to store display data to be displayed on the display section 13.

A display controller 35 is adapted to control displaying of data from the system controller 21 and buffer 33, such as a retrieval menu and data read from the disc 1, on the display section 13.

The image scanner 14 supplies scanned data to the RAM 33 which functions as a temporary memory for temporarily holding the scanned or dot data from the image scanner 14.

A communication circuit 34 transmits/receives data to/from an external device through the connector section 15. The RAM 33 also stores data transmitted to or received from the connector section 15.

In addition, the RAM stores audio data and/or user data read from the disc 1.

Audio information is reproduced in a similar manner as user data information. However, compressed audio signals are read from the disc in intervals at a rate of 1.41 Mbit/sec because the data pickup rate is above five times faster than is required for playback. An advantage of interval playback is that even if the signal flow is interrupted due to shocks or movement, an audio signal is output to the user based on the information already stored in the RAM 33 thereby hiding the interruption in signal flow from the user. When normal playback is resumed, the contents of the buffer 33 are replenished. More specifically, the RAM 33 is adapted to supply data to a sound compression decoder section 38 at a rate of 0.3 Mbit/sec, that is, about ⅕ of the reproducing rate of 1.4 Mbit/sec. The decoder 38 is adapted to decompress audio data which was compressed by a sound compression encoder (for example compression encoder 37 may be used to record audio information on disc 1), and to supply the decompressed audio to a D/A converter 39 that functions to supply analog audio signals, such as left channel L and right channel R audio signals, to terminals 16b.

Audio signals to be recorded are received at terminals 16a from the audio cable 17 or from a microphone, not shown, and applied to an A/D converter 36 that functions to convert the left and right channel analog audio signals into quantized 16 bit digital data having a sampling frequency of 44.1 Kbit and to supply the digital audio data to an encoder 37. The encoder 37 is adapted to compress the audio data using a compression system designed specifically for audio. The compression system utilizes the fact that the sensitivity of the human ear depends on frequency, and also utilizes the masking effect, that is, the fact that a soft sound can be rendered inaudible by a louder sound. The regions of the audio signal to which the human ear is most sensitive are most accurately recorded, while the other regions are less accurately recorded. Since the least accurate recording is in the portion of the signal to which the ear is least sensitive, inaccuracies are unlikely to be noticed. The compression encoder 37 supplies the compressed audio data to the RAM 33. The system controller 21 reads the compressed audio data from the RAM 33, and supplies it to the encoder 30 at predetermined times. The encoder 30 encodes the audio data using CIRC or ACIRC encoding, EFM modulation and the like and supplies the encoded audio data to the magnetic head driving circuit 31, which causes the magnetic head 26 to apply a north or south magnetic field to the disc 1 while the system controller 21 supplies control signals to the optical head 23 so the head 23 outputs recording level laser light.

Figure 3:
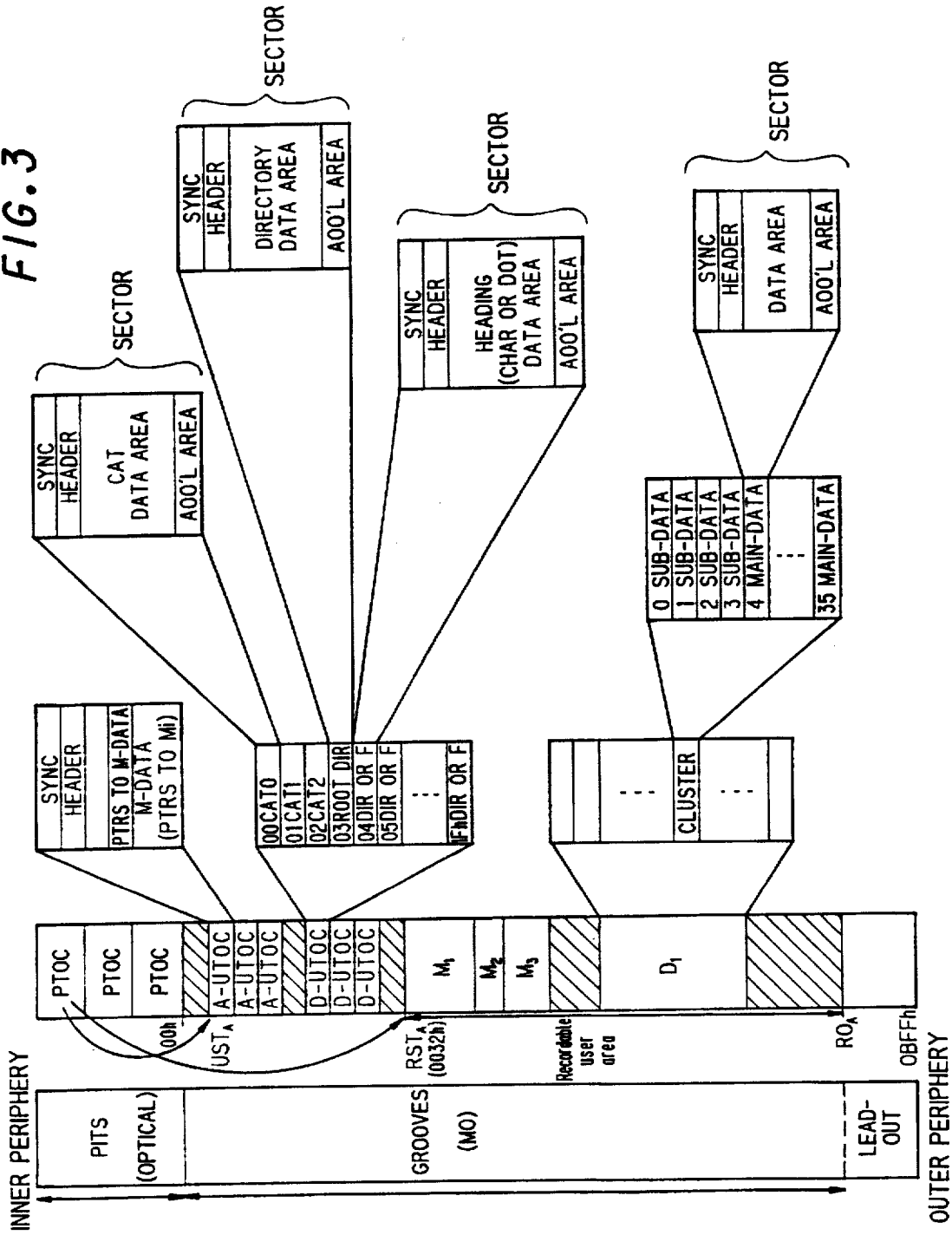

FIG. 3 shows an overview of the areas of the disc 1.

The leftmost column of FIG. 3 shows two physical regions, a pre-mastered region in which data is recorded as pits, and a user recordable region in which data is recorded magneto-optically in pre-grooves, that is, wobbled tracks formed during manufacturing of the disc. The outermost portion of the user recordable area is a lead-out area in which data is not recorded.

The next-to-leftmost column of FIG. 3 shows the logical structure, or memory map, of information recorded on the disc.

The minimum unit for a recording or reproducing operation carried out on a recording track of the disc 1 is defined to be a cluster. Each cluster is defined as including 36 sectors. The first four sectors in a cluster generally contain sub-data and linking information while the remaining thirty-two sectors generally contain main data, that is, management information or information for playback by the user, such as audio data or non-audio data. The nature of the main data depends on where on the disc the cluster is located.

A pre-mastered table of contents (P-TOC) is recorded in the pre-mastered area. The P-TOC has a length of at least one cluster and is recorded three times so that the disc is usable despite an unrecoverable error in one of the P-TOCs. The information in the P-TOC specifies areas such as a recordable user area on the disc and provides management information for read only areas on the disc, not shown in FIG. 3, such as programs recorded on a pre-mastered or hybrid disc.

At the start of the user recordable area, there is a control area containing a first area containing rewritable signals representing first management information for signals representing a first type of information recorded on the disc 1, namely, audio data, such as audio programs. The first management information is a table of contents for user audio data (A-UTOC). The A-UTOC occupies at least one cluster and includes a series of pointers to other portions of the A-UTOC which are themselves pointers to unused areas on the disc and areas in which audio data are recorded.

The control area also contains a second area containing rewritable signals representing second management information for signals representing a second type of information recorded on the disc 1, namely, non-audio data, such as character or graphic image (dot) data. The second management information is a table of contents for user non-audio data (D-UTOC). The D-UTOC occupies at least one cluster. Following the sectors of the D-UTOC containing sub-data information, the first three main information sectors of the D-UTOC are cluster allocation tables (CATs) which indicate the status and linkage of each cluster in the user recordable area, the next (fourth) main information sector of the D-UTOC is a root directory, and each of the remaining 28 main information sectors of the D-UTOC is either a child directory sector, a heading sector for character data files or a heading sector for dot data files. The child directories may be of any generation relative to the root directory, that is, child, grandchild, great-grandchild and so on.

Each of the A-UTOC and the D-UTOC is recorded in triplicate to provide error protection.

The P-TOC contains a pointer to the position of the first management area, located at address $UST_A$. The position of the second management area is the address $UST_A$ plus a predetermined offset which is discussed further below.

Following the control area is a recordable area in which the user audio and/or non-audio data is recorded.

Three audio files are shown as $M_1$, $M_2$ and $M_3$. The A-UTOC contains management information for these audio files. Although not shown, the sectors containing audio data are further divided. A set of two sectors is divided into 11 regions, each called a sound group.

An area for recording user data files is shown as $D_1$. Management information in the A-UTOC defines the boundaries of the area $D_1$ while the D-UTOC contains management information for the user data files in the area $D_1$. Each cluster in the user data contains, as explained above, 32 sectors in which user data may be recorded and, as explained below, each of these sectors has an area of 2048 bytes available for recording user data. Thus, each cluster can have up to 2048×32=65,536 bytes of user data recorded therein, which is 64 Kbytes (1 Kbyte=1024 bytes) or about 65,000 bytes.

The P-TOC contains a pointer to the start of the recordable area $RST_A$, shown as address 0032h in this example, where "h" indicates hexadecimal notation.

When data is to be read to or reproduced from the disc 1, the apparatus 10 reads the P-TOC to obtain the pointer to the start of the A-UTOC. The apparatus 10 reads the A-UTOC into its buffer memory 33, determines the position of the D-UTOC and reads the D-UTOC into its memory 33. If no data U-TOC exists, the disc is determined to be a virgin disc on which no data is recorded and the data U-TOC is initialized.

Audio data can be recorded with reference only to the A-UTOC, except that the P-TOC is referenced to obtain the start of the user recordable area $RST_A$. Audio data is reproduced with reference to the P-TOC, for pre-mastered audio information, and with reference to the A-UTOC, for audio information recorded by the user.

User data can be recorded and reproduced with reference only to the D-UTOC, as long as the capacity of the area $D_1$ is sufficient.

If additional user data capacity is needed on the disc, the A-UTOC must first be adjusted to define additional space for user data, such as by enlarging the area $D_1$ or by defining a new user data area $D_2$. Managing the user data area in this manner prevents an attempt to reproduce the user data as audio data.

When a change is made to the A-UTOC or the D-UTOC in the RAM 33 such as recording or erasing data, the controller 21 rewrites the respective management information on the disc 1, in triplicate, to reflect the change.

Even if the disc 1 is used only for recording non-audio data, the audio U-TOC is needed to distinguish the management areas for audio and non-audio data. Furthermore, the start address of the audio U-TOC, defined in the P-TOC, is needed to determine the start address of the data U-TOC.

Figure 4:
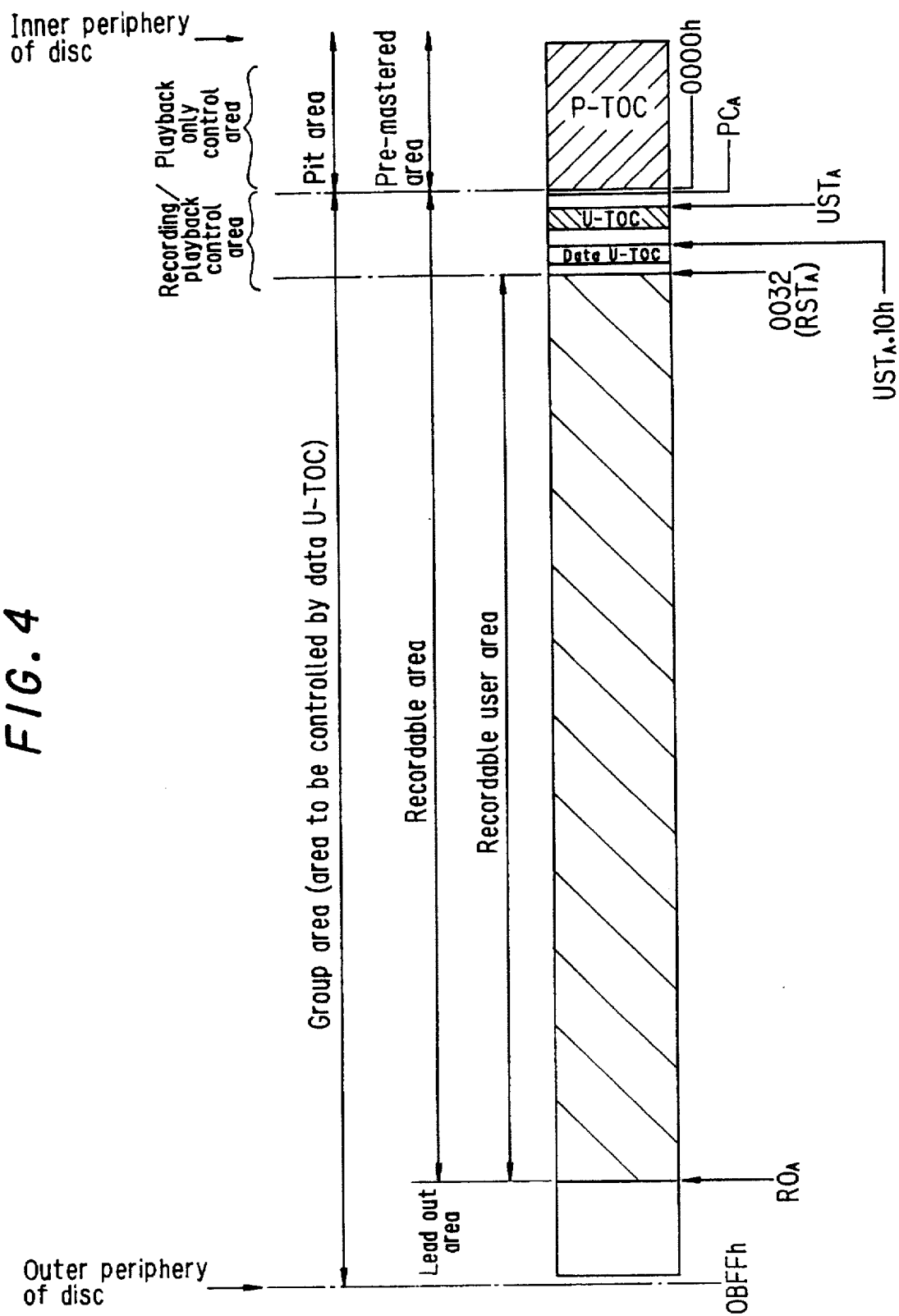

FIG. 4 shows the physical layout of the disc 1 in more detail.

The pre-mastered area wherein the P-TOC is recorded is located at the innermost portion of the disc.

The grooved area is defined as having cluster addresses from "0000h" to "0BFFh". The clusters having addresses from "0000h" to the start of the lead out area $RO_A$ form a recordable area wherein information is recorded magnetically and reproduced optically.

In this recordable area, a recordable user area in which a user may record data, including audio and non-audio data, is located at addresses from the recordable user area start address $RST_A$ (for example, cluster address "0032h" to the lead out start address $RO_A$.

At cluster addresses from "0000h" to $RST_A$ ("0032h"), there is located a control area for different types of management data in which the A-UTOC and D-UTOC may be recorded. In the control area, one power calibration cluster located at address $PC_A$ is provided as an area for calibrating laser power.

When the A-UTOC is located towards the beginning of the control area, specifically, at or before cluster address "0020h", the D-UTOC is located after the A-UTOC. Specifically, the start of the D-UTOC is a cluster address offset for example by "10h" from the starting position of A-UTOC which is indicated by the A-UTOC start address USTA in the P-TOC.

Alternatively, when the A-UTOC is located towards the end of the control area, specifically, after cluster address "0020h", the start of the D-UTOC may be a cluster address offset from the starting position of the A-UTOC for example by "−10h".

FIG. 5 is a diagram showing management of the recording medium by the A-UTOC and D-UTOC. The leftmost column generally shows how the recordable area is perceived by the data U-TOC. The rightmost column generally shows how the recordable area is perceived by the audio U-TOC. For convenience, the P-TOC is shown in the rightmost column.

The audio U-TOC manages the audio data in the recordable user area from the recordable user area start address $RST_A$ to the lead out start address $RO_A$ and manages the boundaries of the non-audio data area therein. FIG. 5 shows three audio files M1, M2, M3 recorded on the disc 1. The A-UTOC contains three parts describing the start addresses, end addresses and modes of the respective audio files. A mode bit, bit d4 discussed further below, is set to a value indicating that each of the files M1, M2, M3 is audio data.

The A-UTOC contains a fourth part indicating the start and end addresses $DST_A$, $DE_A$, respectively, of the non-audio data area $D_1$. A mode bit in the fourth part is set to a value indicating that the area $D_1$ is non-audio data. Otherwise, the non-audio data area is treated by the A-UTOC essentially as a special type of audio file.

The A-UTOC also contains parts indicating that regions NA1, NA2 are free areas, that is, empty areas available for recording data. The areas NA1, NA2 could in fact contain data from a file which had been erased, that is, erasing a file generally corresponds to indicating that its clusters are available for use and not necessarily to erasing the user data file itself. The areas NA1, NA2 are linked together in a list of free areas maintained in the audio U-TOC.

The data U-TOC manages non-audio data files in the non-audio data area defined in the audio U-TOC. FIG. 5 shows four data files DF1–DF4 recorded on the disc 1. The remainder of the data area $D_1$ is seen to be an empty area EA which can be used for recording additional non-audio data.

Directories in the data U-TOC manage file names, extensions, update dates, addresses and linking information for the user data files. As will be explained, data for one data file may be recorded in non-contiguous tracks on the recordable area. The cluster allocation table (CAT) in the D-UTOC indicates the status of each cluster in the recordable area of the disc 1. The CAT identifies the empty area EA using a predefined value for each cluster of the empty area, such as "Fh". When a data file is erased, the CAT reflects the erasure by changing the values for the clusters in the erased data file to the predefined value ("Fh").

The data U-TOC considers the regions WA1 and WA2 in the control area as storing the audio management information A-UTOC and the non-audio management information D-UTOC. The CAT reflects the status of the regions WA1 and WA2.

The data U-TOC considers regions PRW1–PRW4 in the recordable area as regions in which reading and writing are prohibited. The CAT indicates that recording and reproduction is prohibited in the clusters of the regions PRW1–PRW4. The regions PRW1, PRW2 correspond to unused portions of the control area. The region PRW3 corresponds to an unused portion of the control area and to the area in which audio files M1, M2, M3 are recorded. Thus, the D-UTOC prevents the audio files from being accessed and reproduced erroneously as user data and prevents the audio files from being destroyed due to erroneous writing of a user data file over the audio files. The region PRW4 corresponds to the lead out area.

The CAT of the data U-TOC indicates that recording is inhibited (prohibited) in the clusters of the areas NA1, NA2.

FIG. 6 is a diagram showing one sector of the P-TOC provided on the disc 1.

A sector of the P-TOC comprises, for example, a region of 588 rows (row 0 to row 587), each four bytes wide. The start of the P-TOC is a header containing synchronous patterns having bytes that contain all zero bits or all "1" bits, followed by three address bytes for cluster and sector addresses.

Following the header, there is an identification area containing an ASCII code, such as "MINI".

Following the ASCII identification code, there are recorded a disc type, recording level, the number of the first recorded track (First TNO), the number of last recorded track (Last TNO), the lead out start address $RO_A$, the laser power calibration CAL area start address $PC_A$, the start address of the audio U-TOC $UST_A$ and the start address of the user recordable area $RST_A$.

Next is recorded a table containing pointers P-TNO 1 through P-TNO 255 which each correspond to one of up to 255 audio pieces which can be pre-mastered on the disc. These pointers point to management information within the P-TOC.

When the disc is used for recording data only or when no pre-mastered audio area exists on the disc, each byte of the pointers P-TNO 1 through P-TNO 255 is set to "00h".

Following the region of 255 audio pointers, there is a management table section having 255 parts, numbered from (01h) to (FFh). Each part can be pointed to by one of the pointers P-TNO 1 through P-TNO 255. Specifically, a pointer P-TNO contains data having the value of the part number plus an offset corresponding to where the parts table is positioned relative to the start of the sector. Each part contains a start address and an end address for an audio segment such as a program, where "segment" is used to mean contiguous tracks in which the data for the audio file are continuously recorded. Each part also contains one byte (eight bits d1–d8) of mode information (track mode) for the segment. The bits of the mode information byte are used as follows:

| Mode bit | Meaning |
|---|---|
| d1 | whether the segment is recordable or non-recordable |
| d2 | whether the segment is copyright protected |
| d3 | whether the segment is an original or a copied record on and after the second generation |
| d4 | whether the segment is audio or non-audio data |
| d5, d6 | whether the segment is normal audio |
| d7 | whether the segment is monaural or stereo audio data |
| d8 | respective modes of emphasis processing of data in the segment |

It will be appreciated that mode bits d1 and d4 can be used to define a region of the disc as non-recordable and non-reproducible, from the perspective of the P-TOC.

FIG. 7 is a diagram showing one sector of the audio U-TOC provided on the disc 1.

The A-UTOC contains management information for audio files recorded by the user and for areas in which audio information may be recorded by the user.

A sector of the A-UTOC comprises, for example, a region of 588 rows, each four bytes wide. At the start of the A-UTOC is a header containing synchronous patterns having bytes that contain all zero bits or all "1" bits, followed by three address bytes for cluster and sector addresses.

Following the header are recorded data such as a maker code, model code, number of first program (First TNO), number of last program (Last TNO), states of used sectors, disc serial number and disc ID.

Next is recorded a table containing a pointer to a list of defective areas P-DFA on the disc 1, a pointer to a list of unused parts P-EMPTY in the control table of the A-UTOC, a pointer to a list of free areas P-FRA, that is, unused tracks or segments, on the recordable portion of the disc 1 in which a user may record data, and pointers P-TNO 1 through P-TNO 255 which each correspond to a respective audio piece recorded on the MO portion of the disc by the user. These pointers point to management information within the A-UTOC.

Following the pointers region, there is a management table section having 255 parts, numbered from (01h) to (FFh). Each part can be pointed to by one of the pointers P-DFA, P-EMPTY, P-FRA, and P-TNO 1 through P-TNO 255. Each part contains a start address and an end address for an audio segment such as a program, where "segment" is used to mean contiguous tracks in which the data for the audio file are recorded. Each part also contains mode information (track mode) for the segment, as described above with regard to the P-TOC.

In the case of A-UTOC sector 0, because a segment managed by a part of the parts table may be linked to another segment, each part can also contain link information indicating another part in the parts table in which a start address and end address of the segment to be linked are recorded. The value of the link information is the physical location in the A-UTOC of the linked part. Thus, recordable areas may be efficiently used by dividing audio files and recording the divided portions in a plurality of segments that are physically discontinuous without such division being noticeable to the user. This is particularly appropriate when the available recordable space on the disc is fragmented, which commonly occurs after a series of recording and erasing operations. For example, audio information comprising three linked segments has three corresponding parts identifying the linked segments.

As another example, if P-DFA="(03h)" (actually, the value is the position in the sector of the part 03h), the first entry in the list of defective parts is in part (03h), and the next entry is obtained with reference to the link information in the part (03h). If the link information="(00h)", then this part is understood to be the last part of the list of defective areas on the MO disc.

Incidentally, since pre-mastered audio information is normally recorded continuously, that is, without division into physically discontinuous portions, the link information in the P-TOC shown in FIG. 6 is normally set to "(00h)".

As another example, in a MO disc having no audio data recorded thereon and no defects, the pointer to unused areas of the parts tables P-EMPTY="(01h)". The parts in the parts table have the following values:

| Part | Link information |
|---|---|
| 01h | 02h |
| 02h | 03h |
| 03h | 04h |
| ... | |
| FDh | FEh |
| FEh | FFh |
| FFh | 00h |

Thus, it is readily seen that all of the parts in the parts table of the A-UTOC are empty and available for use.

Figure 8:
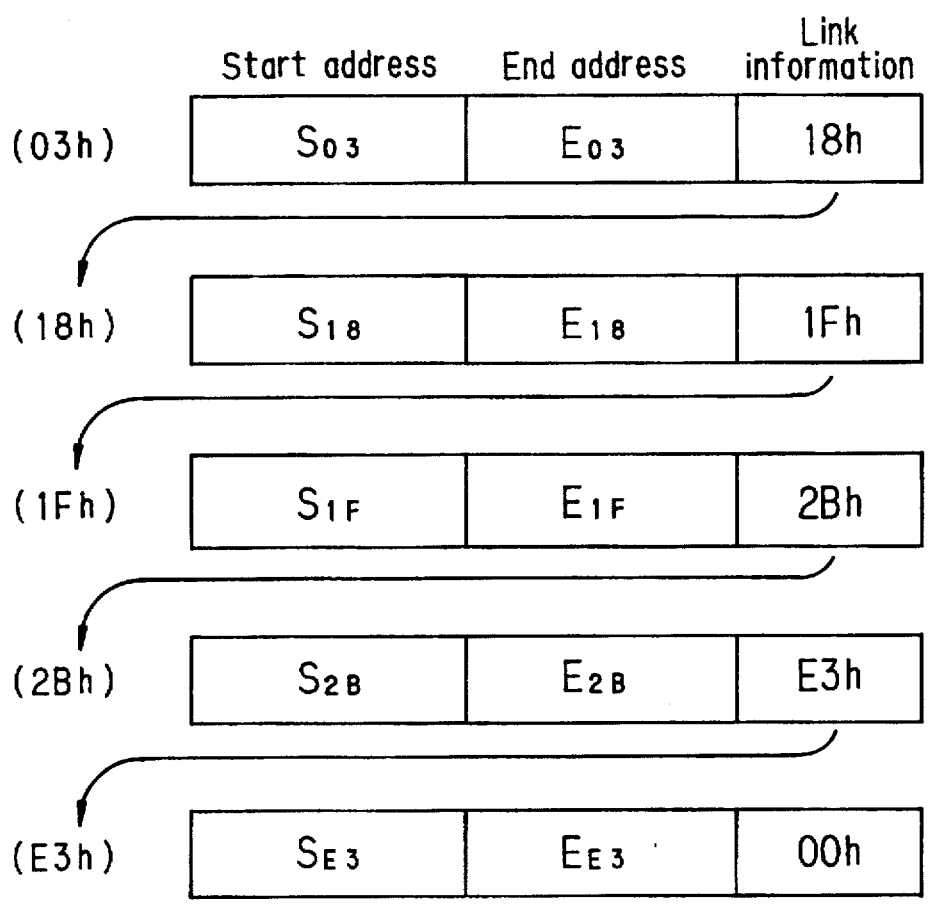
FIG. 8 is a diagram used for explaining a link structure of U-TOC information.

FIG. 8 shows an example of representation of a list of free areas, that is, areas on the MO disc available for recording by the user, having five entries or parts.

The pointer to the list of free areas P-FRA="(03h)", meaning that the head of the list is the part (03h).

The part (03h) shows a start address of S03 and an end address of E03 for the first free area on the MO disc. S03 and E03 are understood to indicate a physically contiguous region of tracks in the user recordable area of the MO disc. The link information of part (03h)="(18h)", indicating that there is another free area on the MO disc.

Similarly, the part (18h) indicates a second physically contiguous free area on the MO disc located from address S18 to E18. The link information of part (03h) indicates that part (1Fh) identifies the next free area on the MO disc, which in turn indicates that part (2Bh) identifies the next free area on the MO disc, which in turn indicates that part (E3h) identifies the next free area on the MO disc. Since the link information of part (E3h)="(00h)", the part (E3h) is seen to be the last free area on the MO disc.

One of ordinary skill in the art will readily appreciate that audio information recorded on the MO disc may be identified in the same manner as described for the free areas on the disc. For example, a second audio file recorded by the user on the MO disc is identified by the pointer P-TN02. The contents of P-TN02 indicate which part of the parts table contains position information for the first region of this second audio file. The remaining regions of the second audio file can be indicated by a linked list of parts in the parts table, in the manner described above for the list of free areas. Since the sequence of segments in which data comprising the second audio file are specified in this manner, the optical head 23 and magnetic head 26 can be controlled to access and reproduce continuous audio information from discrete, physically discontinuous segments thus efficiently utilizing the recording capacity of the MO disc.

It is an important feature of the present invention that the A-UTOC can manage or allocate areas on the MO disc for user data recording using the above-described structure of linked lists of parts.

For example, when four programs are recorded and a certain area is defined to be a general data area, each program is controlled by pointers P-TN01 through P-TN04 and the general data area is controlled by a pointer P-TN05 in the A-UTOC. The apparatus 10 uses the track mode information in the part indicated by the pointer P-TN05 to determine that the region indicated by the addresses in this part contains user non-audio data rather than audio data. Specifically, when bit d4 of the mode information is set to, for example, "1", then the segment is determined to be non-audio data, also referred to as user data or general data, while, when bit d4 is set to "0", the segment is determined to be audio data.

When non-audio data is recorded on the disc as read only pre-mastered pits, it is controlled in the same manner as the pre-mastered audio pieces in the P-TOC described above. Specifically, bit d4 of the mode information in the appropriate part of the parts table shown in FIG. 6 is set to be "1" to distinguish the premastered non-audio data.

In the P-TOC and audio U-TOC, each address comprises 3 bytes (24 bits). The higher order 14 bits indicate a cluster address, the next 6 bits indicate a sector address and the lower order 4 bits indicate a sound group address. These 4 bits are set to be "00h" or "1Ah".

Although there is no restriction that a start address controlled by the audio U-TOC described above should be any particular sound group address, in a case of audio data a convention is adopted in which a start address controlled by the audio U-TOC is set to address "00h" in the sound group and an end address is set to address "1Ah" in the sound group in a case of general data area for recording non-audio data files. Thereby, audio data and non-audio data are prevented from existing together in a cluster.

FIG. 9 shows the data U-TOC cluster. Although the cluster contains 36 sectors, the first four sectors used for sub-data are not shown, so that FIG. 9 depicts only 32 sectors.

Each sector in a cluster used for recording management information for user data, that is, the data U-TOC, or used for recording the user data itself, includes a header comprising 16 bytes.

The first two bytes of the header contain a cluster address (Cluster H, Cluster L). The third byte of the header contains a sector address (Sector).

The fourth byte of the header contains CD-ROM specific mode information.

The fifth through eighth bytes of the header are address bytes (Logical Sector-0 to Logical Sector-3), for use by application programs.

The ninth byte of the header contains mode information (Mode) indicating an error correction mode for the data recorded in the sector. For example, three types of error correction modes providing increasing amounts of error protection may be indicated as mode 0, mode 1 and mode 2 in the Mode byte. Since the data area is the same for each of the error correction modes, a recording/reproducing apparatus capable of operation only with the mode 0 format can operate with a sector in mode 1 or 2 format, although without using the additional error protection capability available in mode 1 or 2. The error correction modes are discussed further below.

The tenth byte of the header contains category information (Category) indicating an attribute of a data file, as discussed above.

When the category byte is "00h" it indicates that the sector is available for recording data.

For a sector in which user data is recorded, the category byte can indicate that binary, character or image data is recorded in the sector. It will be appreciated that binary data bytes are used by an application program.

For a sector in which management information for user data is recorded, i.e., one of the D-UTOC sectors, the category information indicates whether CAT information, directory information or heading information for a user data file is recorded in the sector. During an erasing operation, the controller 21 sets the category byte of a sector to "00h".

The eleventh byte of the header contains index information (Index) indicating a parameter of the data file. During an erasing operation, the controller 21 sets the index information of a sector to "00h".

The category byte values and following index byte values are defined as shown in the following table.

| Category byte | Meaning of category byte (what is recorded in this sector) | Meaning of index byte |
|---|---|---|
| 00h | this sector is unused. | — |
| 01h | binary data | size of the data area being used, in number ("00h" to "10h") of 128 byte units |
| 10h–1Fh | document data | size of the data area in number of 128 byte units |
| 20h–2Fh | one image (e.g., one scanned sheet) recorded as black and white dot data | size of the data area in number of 128 byte units |

-continued

| Category byte | Meaning of category byte (what is recorded in this sector) | Meaning of index byte |
|---|---|---|
| 30h–3Fh | multiple images (e.g., a plurality of scanned sheets) recorded as black and white dot data | size of the data area in number of 128 byte units |
| E0h–E2h | allocation table (e.g., CAT) | If sector is not used, the index byte is "00h". If sector is used, the index byte is nonzero. |
| F0h–F1h | directory | the number (0 to 64) of directories recorded |
| FEh–FFh | heading | the number of heading parts recorded (0 to 32 for document files, 0 to 4 for dot image files) |

The twelfth byte of the header is reserved.

The last four bytes of the header contain identification information, usually four ASCII characters set to "MINX" by the controller 21 in the case of non-audio or user data.

In the data U-TOC, the first three sectors (sector 00 to sector 02) are used for cluster allocation tables (CATs) CAT0 to CAT2. The fourth sector (sector 03) is used for a root directory. The remaining 28 sectors (sectors 04 to 1Fh) are reserved for use as either child directories of the root directory or as heading sectors.

Figure 10:
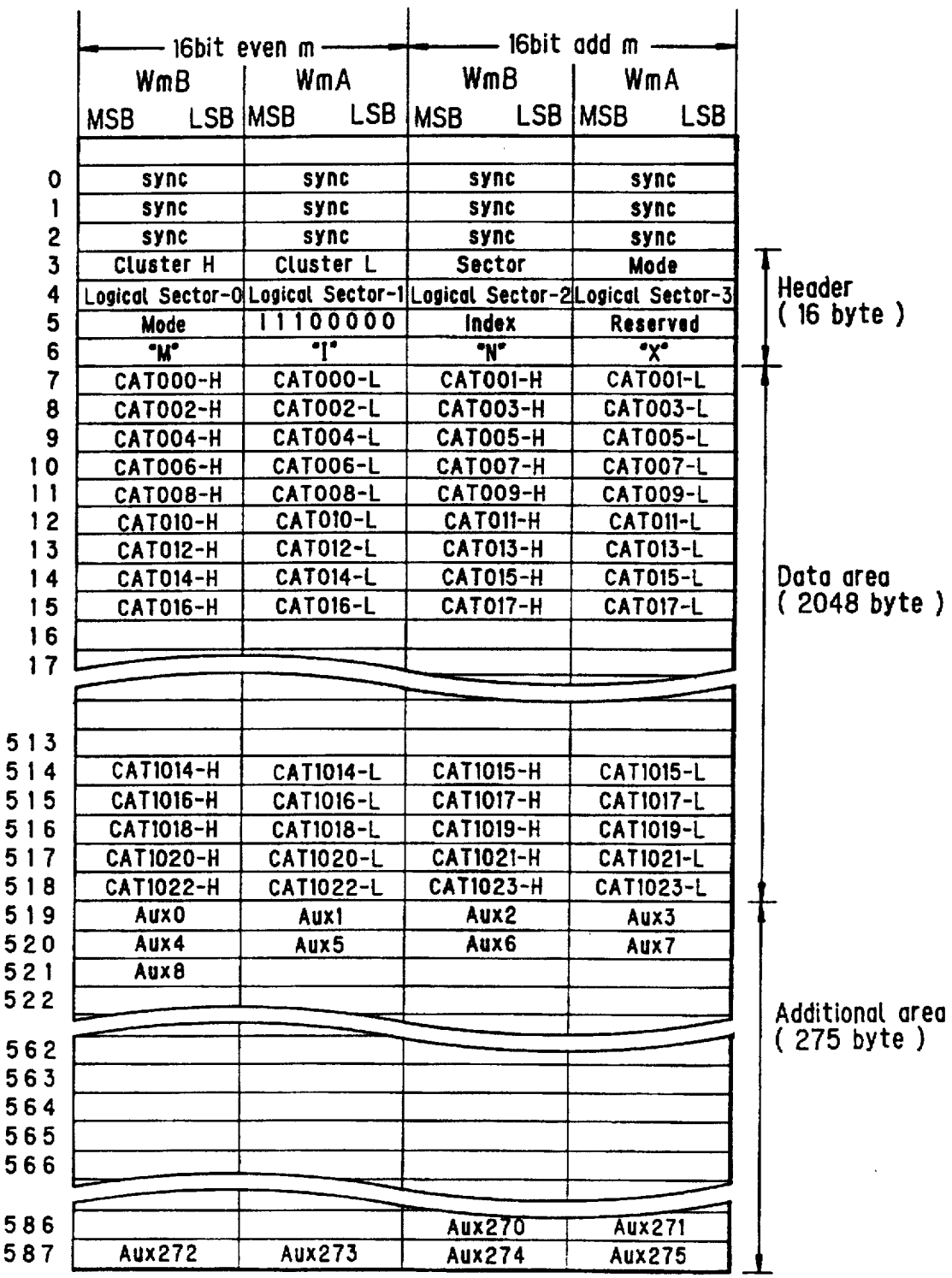
Figure 11:
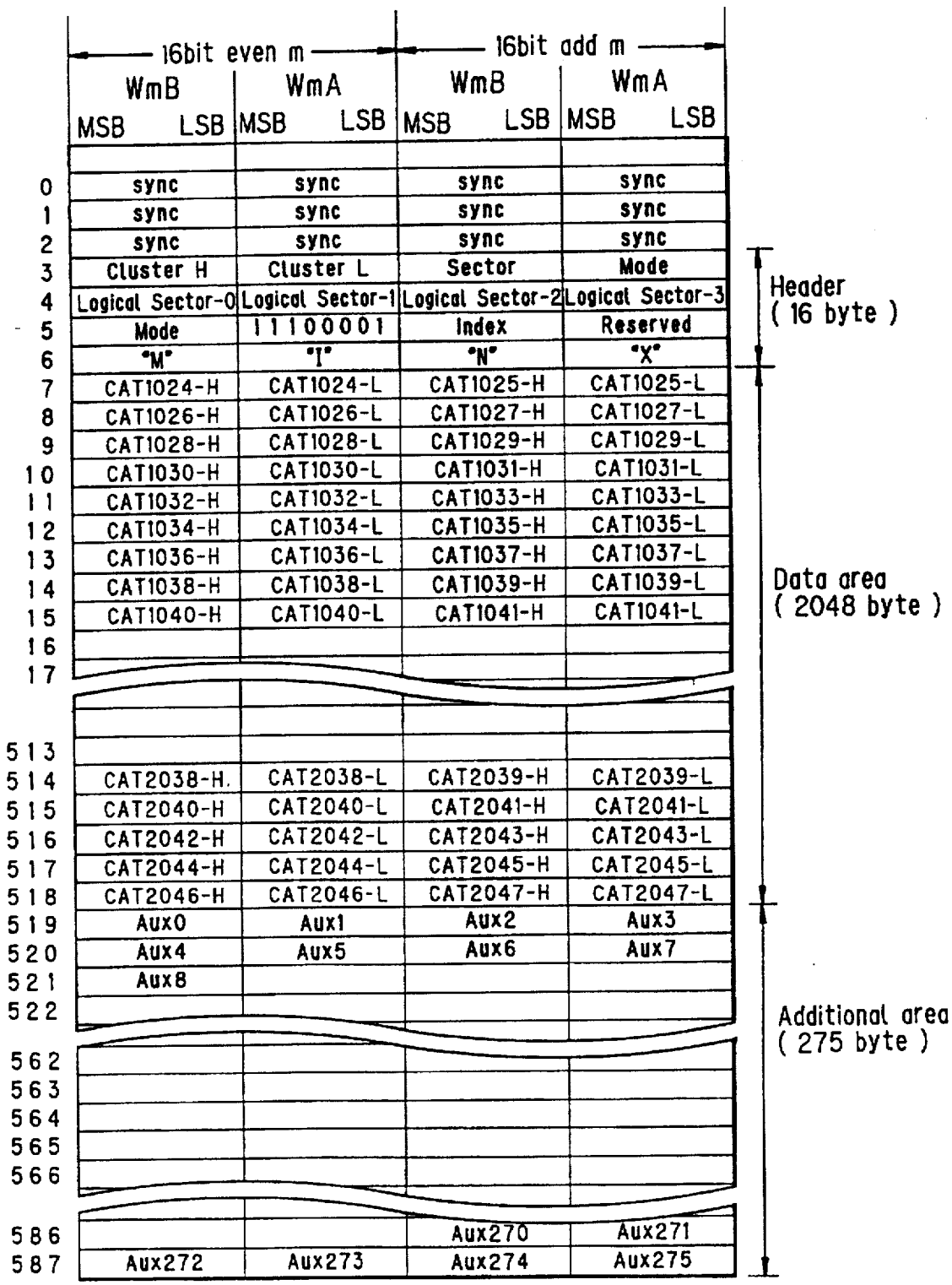

FIGS. 10, 11 and 12 are diagrams of the CAT0, CAT1 and CAT2 sectors, respectively. For each CAT, an ASCII identification code "MINX" is recorded in the four ID bytes located at the end of the header to indicate that this sector is used for non-audio information. When the data U-TOC is initialized or when it is rewritten, the recording/reproducing apparatus 10 records this "MINX" ID code in each sector of the data U-TOC so that the D-UTOC can be distinguished from the P-TOC and the A-UTOC.

The tenth byte of the header of the CAT0 sector is set to "11100000" (E0h), the tenth byte of the header of the CAT1 sector is set to "11100001" (E1h), and the tenth byte of the header of the CAT2 sector is set to "11100010" (E2h), to identify the respective CAT sectors.

Each CAT has a data area comprising 2048 bytes. Each pair of bytes in the CAT data area indicates the linkage status of a cluster in the user recordable area, namely, the clusters "0000h" to "0BFFh" (3071) in FIG. 4. The CAT0 contains information on clusters 0–1023, the CAT1 contains information on clusters 1024–2047 and the CAT2 contains information on clusters 2048–3071.

FIG. 13 shows one unit, that is, two bytes, referred to as a high byte H and a low byte L, of information in the CAT data area. Each of these units corresponds to one cluster in the user recordable area. The two byte unit is divided into words W0 to W3 each having four bits. The word W0 indicates a category of the cluster and the words W1 to W3 are used when the cluster is linked to another non-contiguous cluster, that is, when multiple clusters are used to represent a data file; when a length of consecutive empty clusters is indicated; or when coupling information is indicated when the cluster is the head cluster of the data file.

FIG. 14 indicates the usage of the bits in the word W0 of each unit of information in the CAT data area.

When the word W0="Fh", it indicates that the cluster is an empty cluster available for recording. The words W1 to W3 indicate a length of consecutive empty clusters following this cluster.

When the word W0="Eh", it indicates that the cluster is the end cluster of a data file.

When the word W0="Dh", it indicates that the cluster is followed by another cluster representing the same data file.

When the word W0="Ch", it indicates that the cluster is a head cluster in a certain data file, and the words W1 to W3 indicate the next cluster.

When the word W0="Bh", it indicates that a jump should be made from the instant cluster to the cluster indicated by the words W1 to W3.

When the word W0="6h" to "1h", it indicates that the cluster is a recording inhibited cluster, more particularly:

"6h" indicates a cluster at the end portion of the data file,

"5h" indicates a cluster followed by a next contiguous cluster,

"4h" indicates a cluster at the head of the data file, and

"3h" indicates a cluster followed by a non-contiguous cluster at the address indicated by the words W1 to W3.

When the word W0="0h", it indicates that at least one of recording and reproduction is not permitted in the cluster. The word W0 corresponding to a cluster having audio information recorded therein is set to "0h".

The following table regarding head clusters will now be appreciated:

| Value of word W0 | Value of each of words W1, W2, W3 | Meaning |
|---|---|---|
| Ch or 4h indicating head cluster | 000h | the data file continues in the next contiguous cluster |
| | FFFh | the entirety of the data file is located in the instant (head) cluster |
| | other | the data file continues in the non-contiguous cluster indicated by the words W1, W2, W3 |

For example, when one data file is recorded in four contiguous clusters, specifically, the zeroth to third clusters, this situation is represented in the CAT0 table as follows (* is an unspecified value):

|  | W0 | W1 | W2 | W3 |
|---|---|---|---|---|
| CAT000 H, L | Ch | 0 | 0 | 0 |
| CAT001 H, L | Dh | * | * | * |
| CAT002 H, L | Dh | * | * | * |
| CAT003 H, L | Eh | * | * | * |

Because recording tracks are formed spirally on the disc 1, data files are frequently recorded on consecutive clusters. Accordingly, because the aforementioned CAT arrangement eliminates the need to consider the words W1, W2 and W3 in many cases, it improves the efficiency of the management information for user data.

Figure 15:
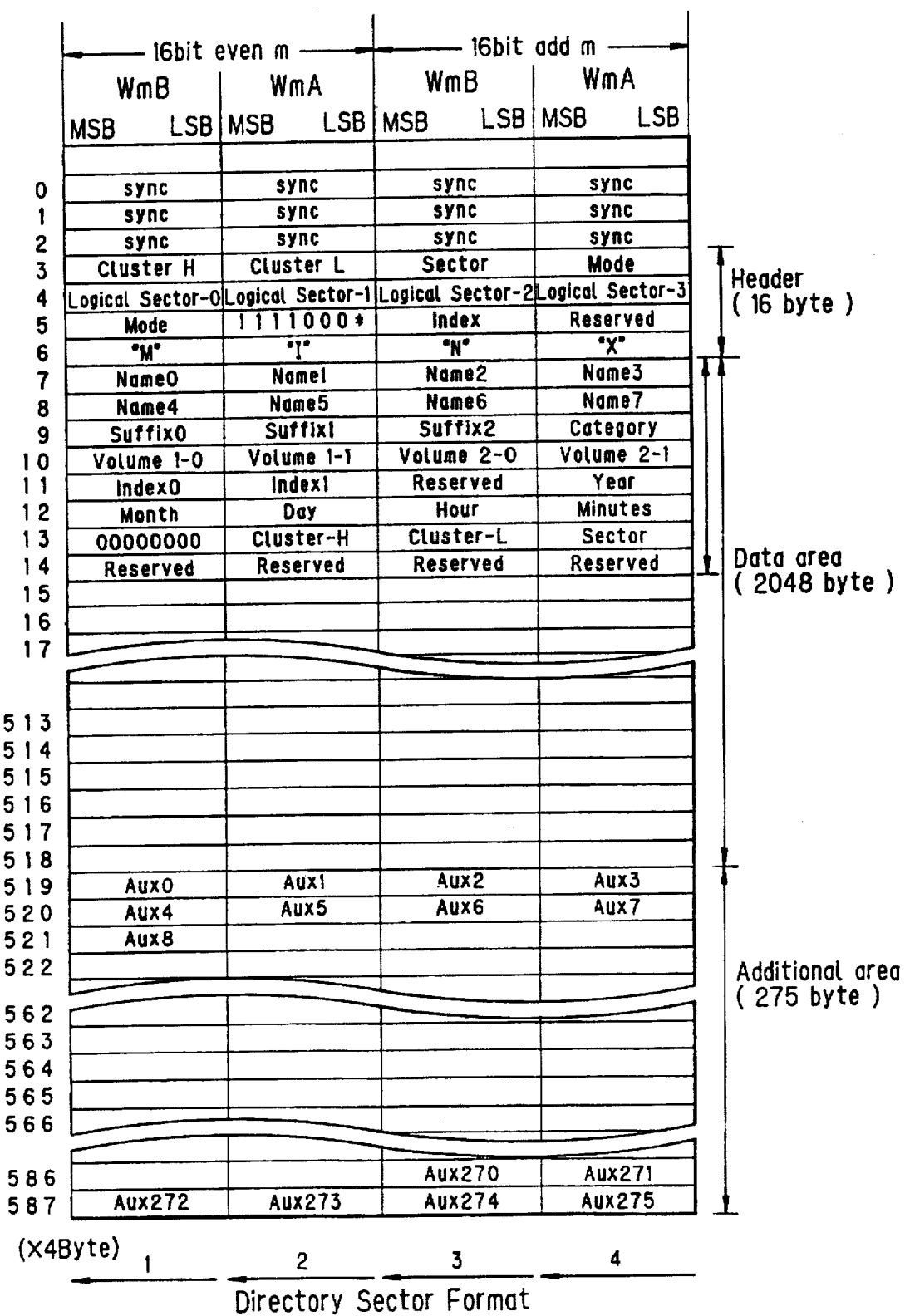
FIG. 15 shows a directory sector of the data U-TOC information.

FIG. 15 shows the format of a directory sector of the data U-TOC. The root directory of the fourth sector (03h) and each of the child directories in the unspecified sectors (04h to 1Fh) have this format.

Sync information is located at the start of the sector.

Header information follows the sync information. The sector is identified as a directory sector by its category information in the tenth byte of the header. When the tenth byte is "11110000" ("F0h"), the sector is the root directory. When the tenth byte is "11110001" ("F1h"), the sector is a child directory. The header information includes four bytes of ASCII ID information set to "MINX" indicating that the sector is used for non-audio data. The recording/reproducing apparatus 10 refers to the ID information to determine the type of management information stored in this sector.

A data area of 2048 bytes follows the header information. Each directory entry in the data area occupies 32 bytes. Up to 64 directory entries can be recorded in the data area of each directory sector. A directory entry provides retrieval information for the data file to which it corresponds.

The format of a directory entry is as follows.

Names of data files are recorded in the first eight bytes (Name 0 to Name 7). The extension portion of file names are recorded in the following three bytes (Suffix 0 to Suffix 2).

Category information is recorded in one byte of each directory entry following the extension, and indicates an attribute of a data file to which the directory entry corresponds. Category information is discussed further below.

Volume information is recorded in four bytes (Volume 1-0, Volume 1-1, Volume 2-0, Volume 2-1) of each directory entry following the category byte. The first two bytes of the volume information indicate the number of clusters occupied by the data file to which the directory entry corresponds, that is, how many clusters need to be accessed to reproduce the data file. The last two bytes of the volume information indicate the memory capacity needed by a host device to receive and use the data file corresponding to this directory entry. The volume information is set to "00h" to indicate it is undefined.

Heading sector index information is recorded in two bytes (Index 0, Index 1) of each directory entry following the volume information. When a heading sector for the data file corresponding to the directory entry is in the same cluster as the directory sector for this data file, the sector number of the heading sector is recorded as the first heading sector index byte (Index 0) and the heading part number (described later) within the sector of the heading sector is recorded as the second heading sector index byte (Index 1). When the heading sector is in a different cluster than the directory sector, the first heading sector index byte is set to "00h".

Following the heading sector index information in each directory entry, there is a reserved byte.

Date information is recorded in five bytes (Year, Month, Day, Hour and Minutes) following the reserved byte in each directory entry, indicating when the data file to which the directory entry corresponds was last updated.

Address information for the data file to which the directory entry corresponds is recorded in three bytes (Cluster-H, Cluster-L and Sector) following the date information.

A directory can include directory entries only for child directories, that is, a directory is prohibited from indicating directories more than one generation distant from itself.

When the data U-TOC is initialized, the root directory is created in the fourth sector (sector 03) of the data U-TOC. When a child directory is created, an entry therefor is provided in the root directory, indicating the address of the child directory. This process is repeated when additional directories are created in the child directory.

It is a feature of the present invention that all directory information required to access a file can be retrieved using only one disc access, as long as all the directory units exist within one cluster. Multiple clusters are used for the data U-TOC only when the management information for the user data exceeds the capacity of one cluster, that is, there are very many short files recorded on the disc 1.

Up to 28 directory sectors can exist in a data U-TOC cluster. Each sector can include 64 directories. Thus, 1792 directories can be defined within a data U-TOC cluster. If additional directories are needed, an additional cluster for child directories can be provided at an arbitrary location in the recordable user area. This additional cluster is recorded in triplicate in consecutive clusters.

Figure 16:
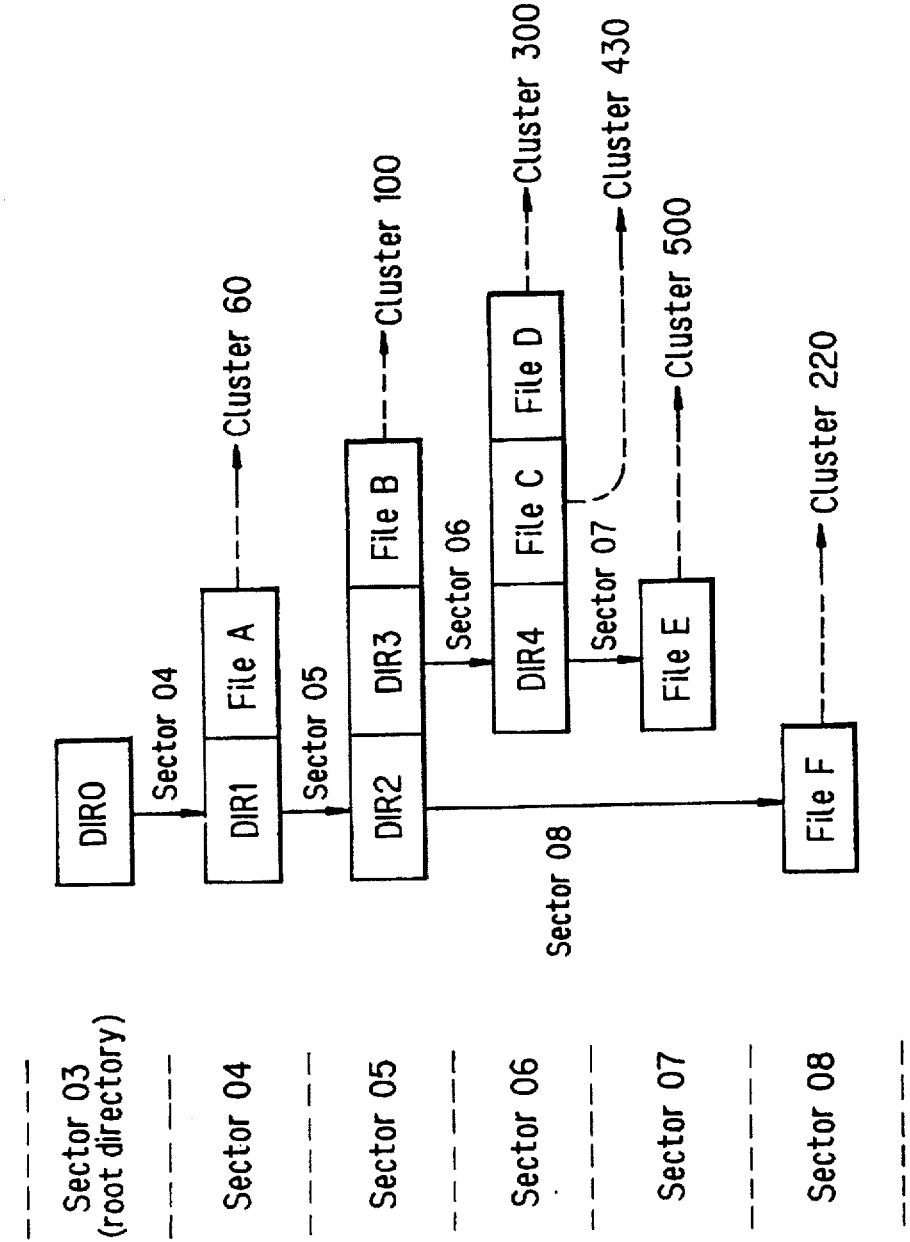
FIG. 16 shows an example of a directory hierarchical structure which may be represented in the data U-TOC information.

FIG. 16 shows an example of a directory hierarchical structure which may be represented in the data U-TOC management information.

Each block in FIG. 16 corresponds to a directory entry indicating a directory (DIR) or a heading file (File). The lefthand column of FIG. 16 indicates in which sector of the data U-TOC the directory entry is recorded. The solid line arrows indicate a child directory, and in which sector the child directory entry is recorded. The broken line arrows indicate a data file and its corresponding cluster in the user recordable area.

As an example, to retrieve the directory information for a data file "FileE", the root directory (DIR0) is accessed, then its child directory (DIR1), then its grandchild (DIR3), then its great-grandchild (DIR4), which contains the directory entry for "FileE". This directory entry indicates that the address of "FileE" is cluster 500. Since all directory entries are located within the same cluster, only one disc access is required to obtain the directory information for this file. If this cluster has previously been read into the RAM 33, then no disc accesses are required.

Figure 17:
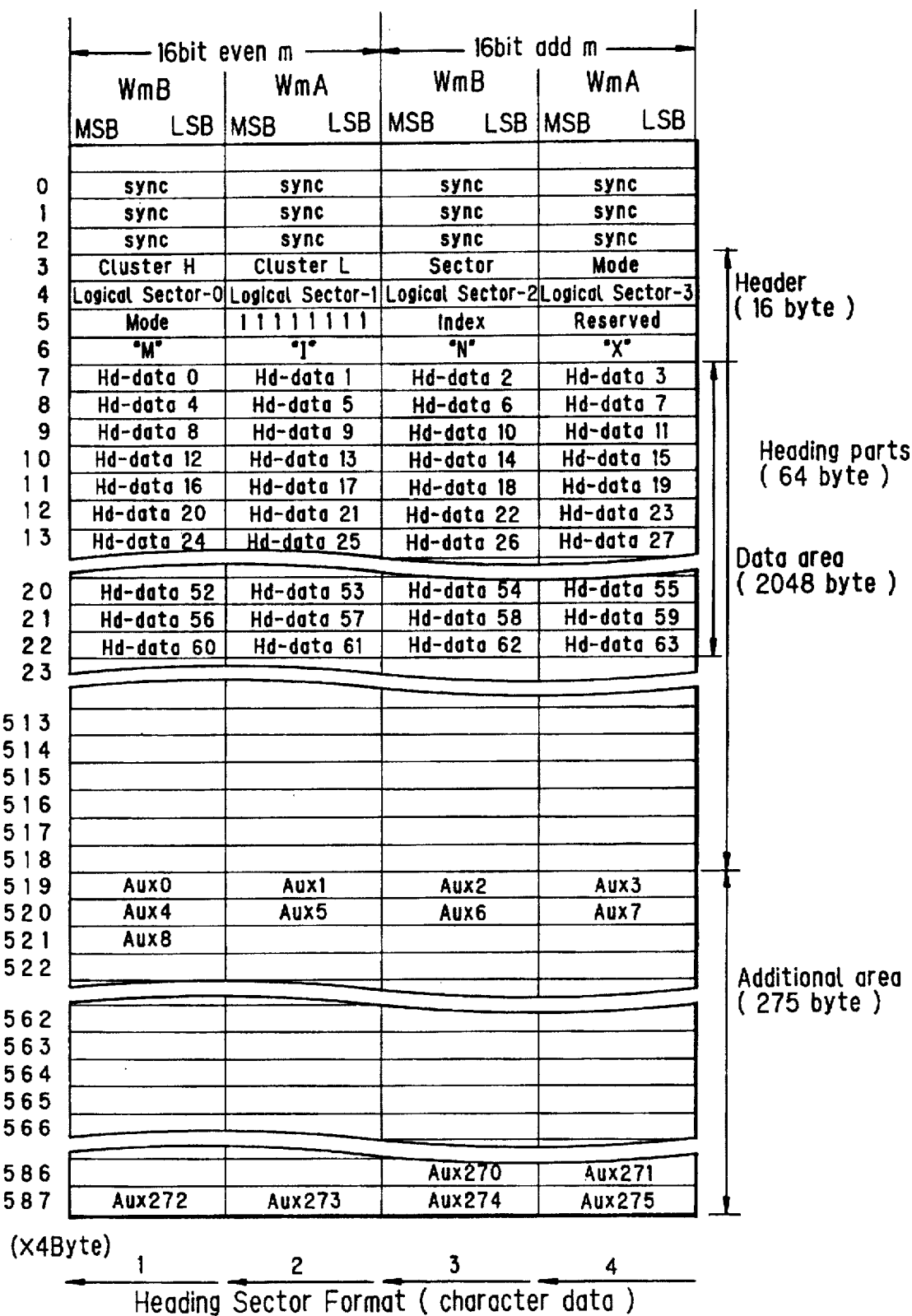
FIGS. 17 and 18 are diagrams showing heading sectors for character and dot data, respectively, represented in the data U-TOC information.
Figure 18:
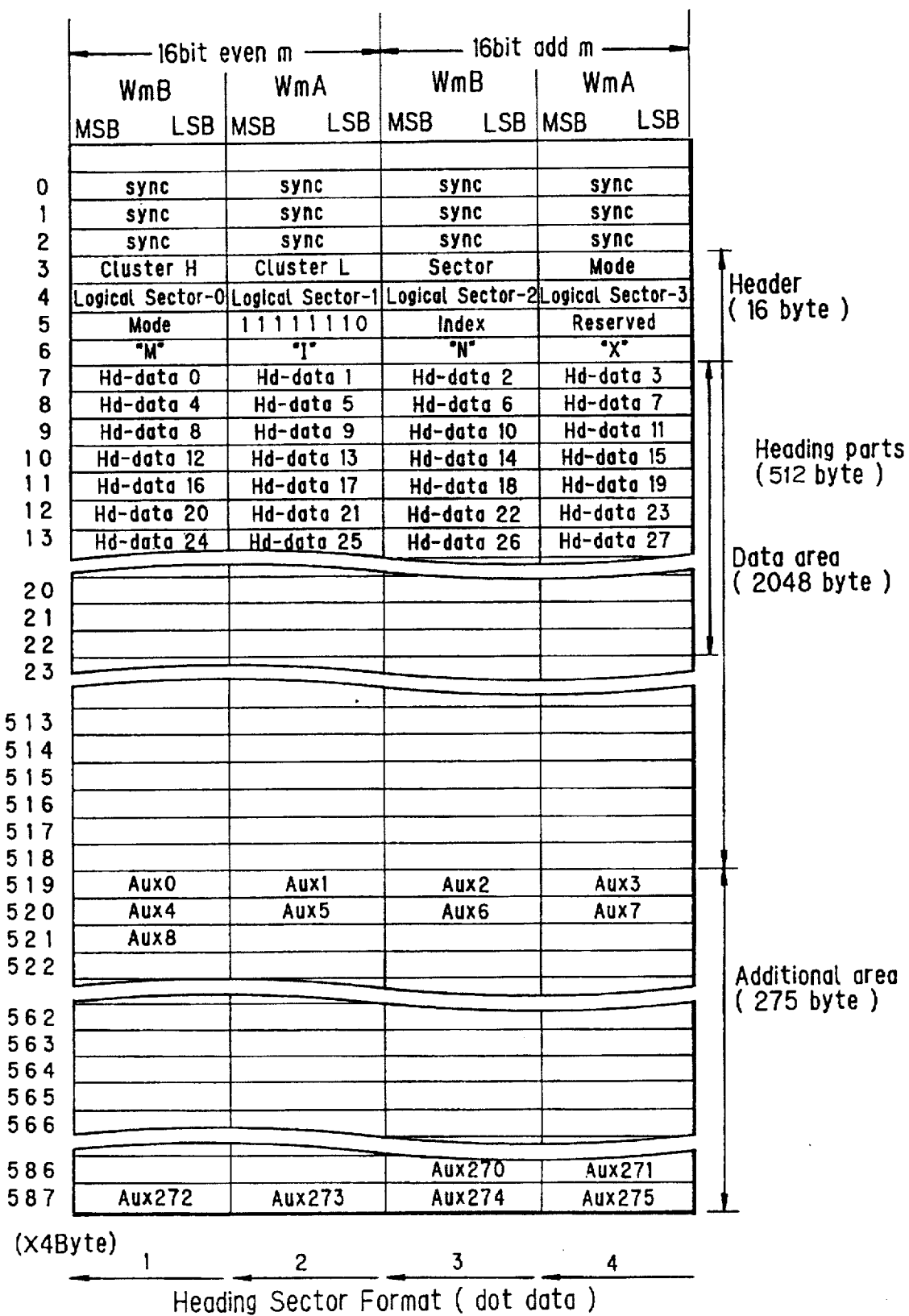

FIGS. 17 and 18 are diagrams showing heading sectors for character and dot data, respectively, represented in the data U-TOC information. Any of the 28 sectors following the root directory may be used as a heading sector.

Sync information is located at the start of each heading sector.

A header follows the sync information in each heading sector. Category information in the tenth byte of the header is set to "11111111" ("FFh") to indicate that the sector is a heading sector for character or document information. Category information in the tenth byte of the header is set to "11111110" ("FEh") to indicate that the sector is a heading sector for dot data, that is, an image.

Index information in the header indicates how many heading parts, defined below, are contained in the heading sector.

The last four bytes of the header of a heading sector are set to "MINX". As is the case with CAT and directory sectors, the recording/reproducing apparatus 10 refers to the system ID "MINX" to determine if the sector contains management information for user data.

A data area of 2048 bytes follows the header in each heading sector. Heading parts are recorded in the data area and contain reference information. Each heading part is referenced from a directory entry by recording the sector number and part number of the heading part in the heading sector index information (Index 0, Index 1) of the directory entry, as described above.

Each heading part for character information has a length of 64 bytes (Hd-data 0 to Hd-data 63) and is created by the controller 21 sampling a specified location within a data file, such as its head or starting characters. Alternatively, the heading part may include a character portion specified by the user or by an application program. A maximum of 32 heading parts for character data may be recorded in the data area of a heading sector.

Each heading part for dot data has a length of 512 bytes (Hd-data 0 to Hd-data 511) and is created by the controller 21 sampling a specified location within the dot data file or by arranging a related graphic pattern (a so-called icon) corresponding to the data file. A maximum of 4 heading parts for dot data may be recorded in the data area of a heading sector.

The reference information recorded in each heading part facilitates file selection by the user, for example, by making it easier to distinguish the contents of a file, and allows program retrieval, for example, by a parameter other than a file name.

For example, when a data file contains character information, the heading parts can be used for keyword retrieval. When there are many directories, it may be impractical to retrieve a file based only on a specific keyword, keyword based file retrieval is often possible based on the information in the heading parts referred to by each directory entry. Since the heading sectors are usually in the same cluster as the directory entry, fast keyword retrieval is realized.

As described above, the data U-TOC comprising CAT sectors, directory sectors and heading sectors allows management of user data. This data U-TOC is useful on a recording medium used by data processing machines for inputting/outputting (and recording/reproducing) document and image (dot) data files and their file names. User or non-audio data management is accomplished substantially independently from audio data management.

FIGS. 19–22 are diagrams showing the structure of data sectors which may be recorded by a user on the recording medium 1. It will be recalled that the minimum unit for recording and/or reproducing (i.e., the input unit for the encoder 30 in FIG. 2 and the output unit for the decoder 28 in FIG. 2) is one cluster.

Figure 19:
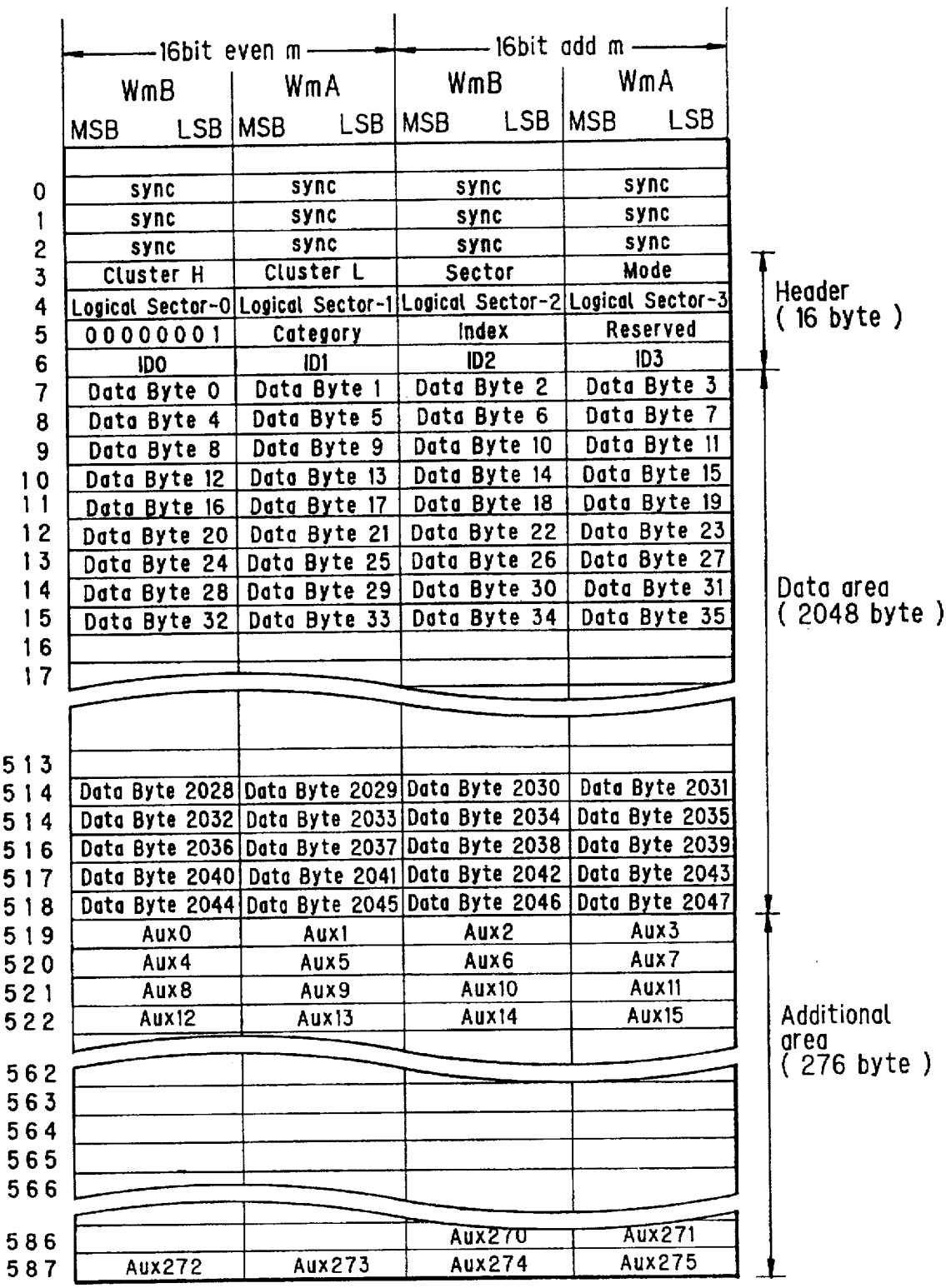
FIGS. 19-22 are diagrams showing the structure of data sectors on the recording medium according to the present invention.

FIG. 19 generally shows the format of a data sector for the user recordable area. It will be appreciated that the sectors in the data U-TOC also have this general format. Each sector includes 4×588 bytes.

The first 12 bytes of the sector are synchronization patterns. A sync pattern used with CD-ROM recording media may be employed with a recording medium according to the present invention.

The following 16 bytes are the header for the sector.

A data area of 2048 bytes follows the header.

An additional area of 276 bytes (Aux 0 to Aux 275) follows the data area. In modes 1 and 2, the additional area contains error detection and correction data.

Figure 20:
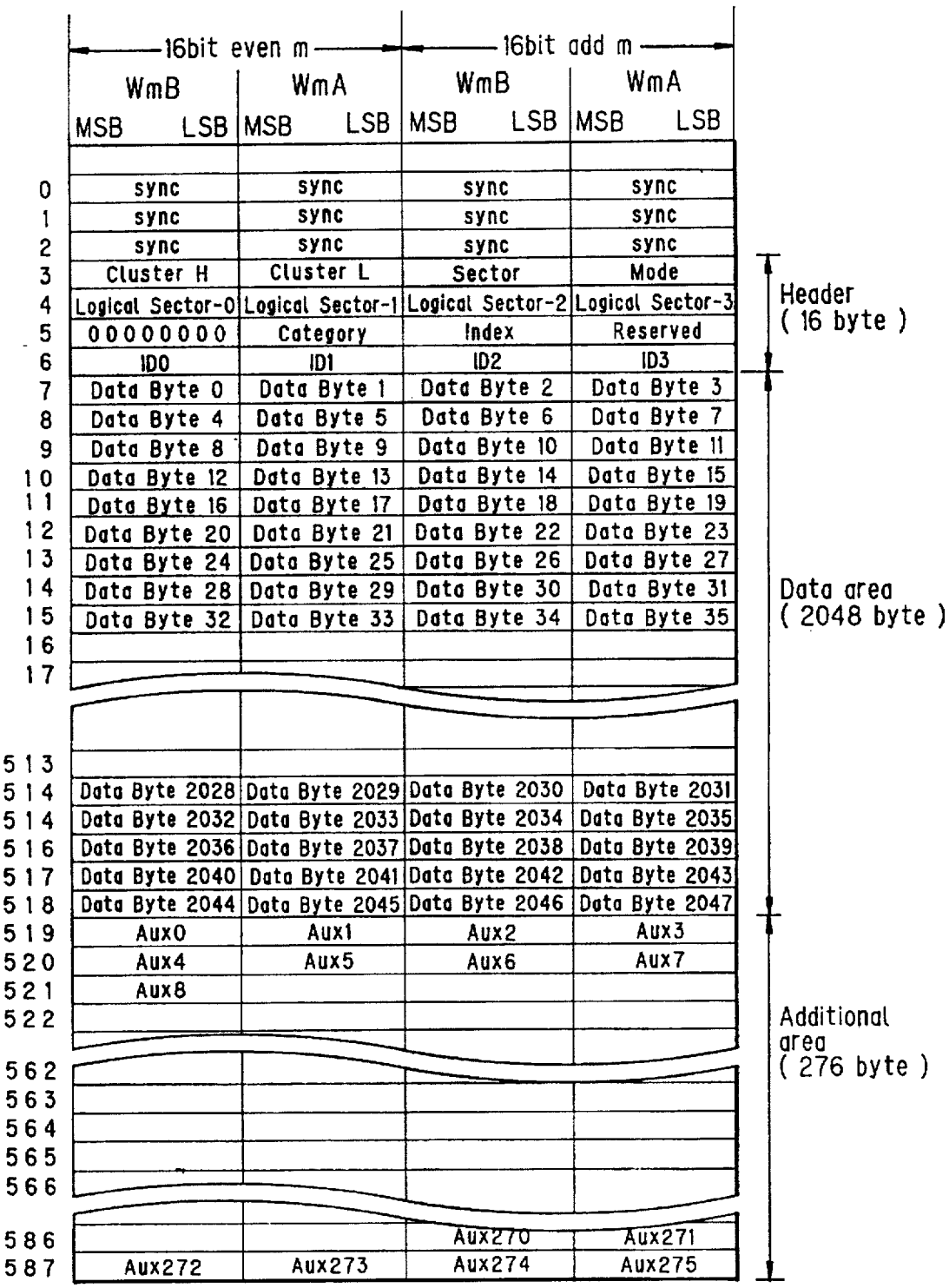
Figure 21:
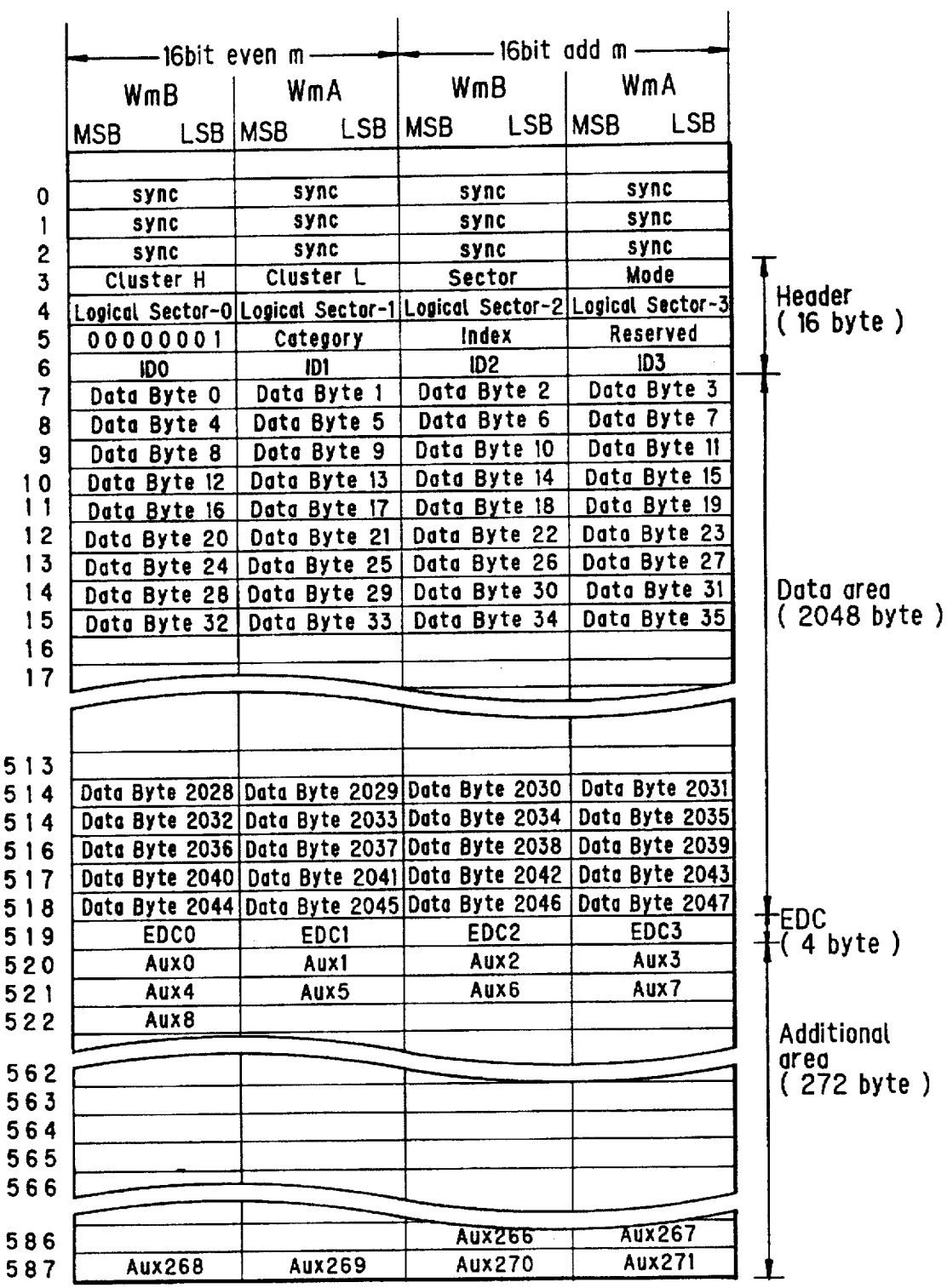
Figure 22:
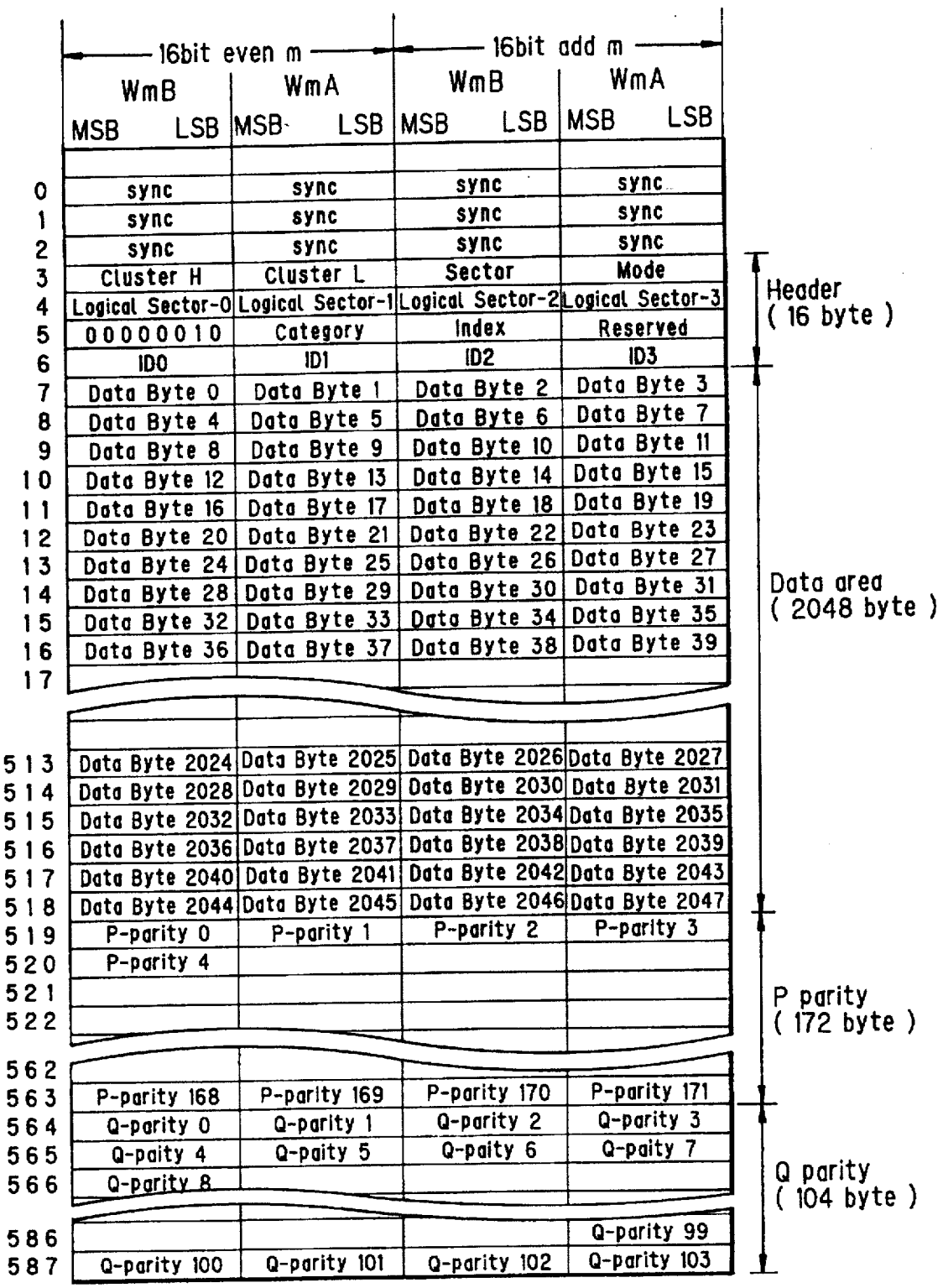

FIG. 20–22 show data sectors having the three error correction modes mentioned above.

When the ninth byte of the header (Mode) is "00000000" ("00h"), "00000001" ("01h"), or "00000010" ("02h"), the first mode (mode 0), second mode (mode 1), or third mode (mode 2) is indicated, as shown in FIGS. 20, 21, 22, respectively.

In mode 0, an area for error detection and correction data is not particularly provided. That is, the additional area bytes (Aux 0 to Aux 275) are undefined. For a mode 0 sector, only CIRC code error detection and correction is implemented in the decoder 28 shown in FIG. 2. As is well known, a CIRC code has a reasonably good error correction ability.

In mode 1, four bytes of error detection and correction parity code data (EDC 0 to EDC 3) are provided for detecting and correcting errors in the additional area following the data area. A generating polynomial for the parity code bytes may be:

$$P(x)=(x^{16}+x^{15}+x^2+1)\times(x^{16}+x^2+x+1)$$

The remaining bytes (Aux 0 to Aux 271) of the additional area are undefined. For a mode 1 sector, an error can be detected only by digital signal outputs from the decoder 28 shown in FIG. 2 without using an error detection result from the decoder 28 for the reproduced information from the disc.

In mode 2, the entire additional area contains error detection and correction data. For example, P parity (P-parity 0 to P-parity 171) may be provided in the first 172 bytes of the additional area and Q parity (Q-parity 0 to Q-parity 103) may be provided in the remaining 104 bytes of the additional area. An error correcting ability of about 80 bytes in maximum is thus achieved. The P parity and Q parity data are arranged in the same manner as the Reed Solomon code having a distance (26, 24) with Galois Field (28) adopted for CD-ROM.

Figure 23:
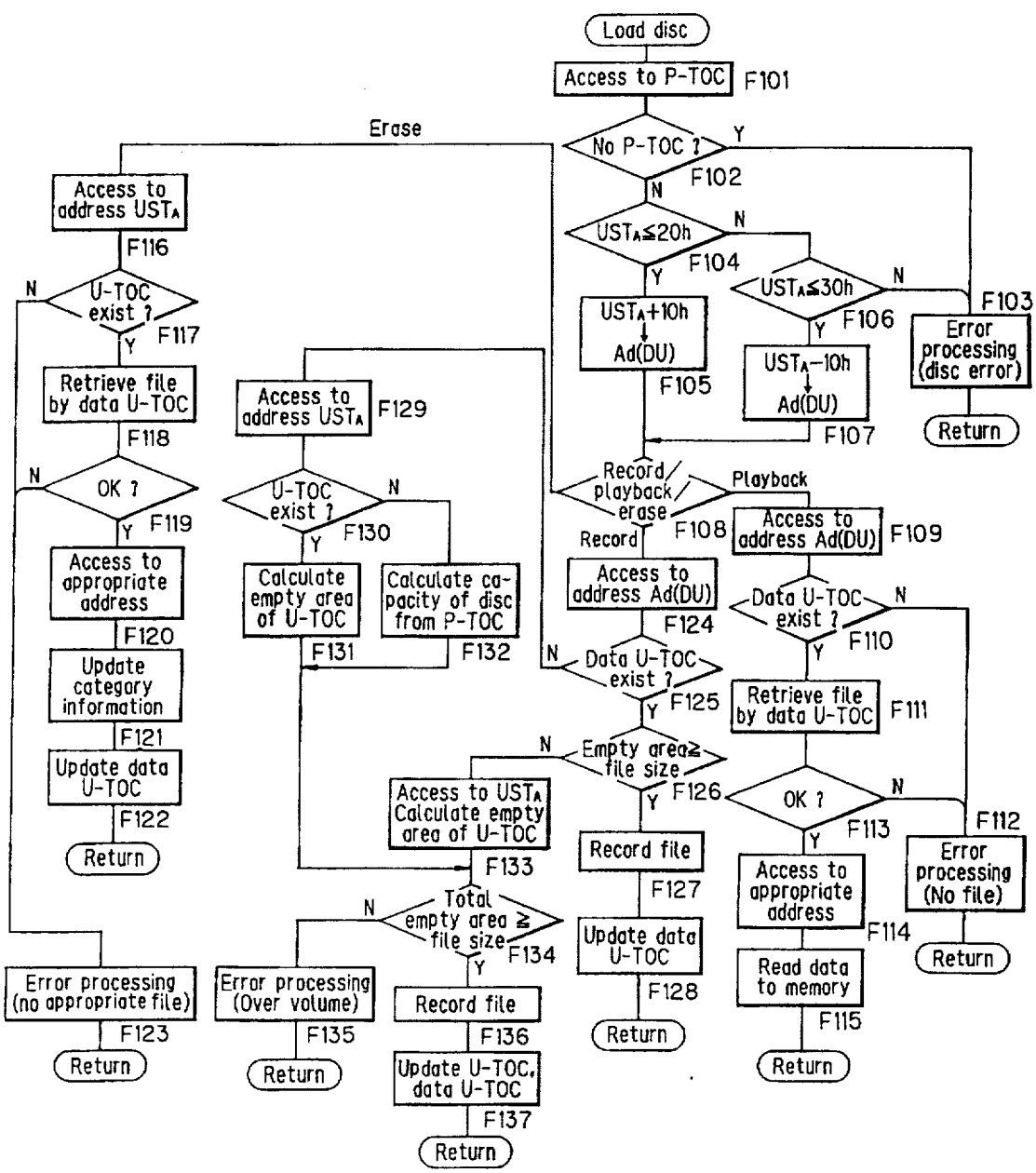
FIG. 23 is a flow chart of operation of the recording/reproducing apparatus according to the present invention.

FIG. 23 is a flow chart of operation of the recording/reproducing apparatus 10 using the data U-TOC.

When the disc 1 is inserted in the apparatus 10, the P-TOC is read into the buffer RAM 33 (step F101).

If the P-TOC is not found, error processing is carried out considering that it is not an adequate disc (steps F102 and 103), such as displaying an appropriate message to the user.

After the P-TOC data is read in, the audio U-TOC start address $UST_A$ is obtained to identify the position of the audio U-TOC, and the system controller 21 of FIG. 2 determines whether the audio U-TOC start address $UST_A$ is smaller than cluster address "20h" (step F104).

If $UST_A$ is less than or equal to "20h", a start address Ad (DU) of the data U-TOC is set to (USTA+"10h"), because there is room for recording three consecutive clusters of data U-TOC in the control area for management data after the audio U-TOC (step F105).

If $UST_A$ is greater than "20h", the controller 21 determines whether $UST_A$ is smaller than "30h" (step F106).

If $UST_A$ is larger than "30h", the audio U-TOC is not recorded at an appropriate position as the at least one cluster of the audio U-TOC cannot be recorded in three consecutive clusters of the control area for management information, so error processing is carried out (step F103).

If $UST_A$ is less than or equal to "30h", the start address Ad (DU) of the data U-TOC is set to (USTA−"10h"), because there is room for recording three consecutive clusters of data U-TOC in the control area for management data before the clusters of the audio U-TOC (step F107).

After the address of the data U-TOC is determined as described above, the recording/reproducing apparatus 10 waits to be instructed to record, reproduce or erase data (step F108).

When the apparatus 10 is instructed to reproduce data, the data U-TOC at the address Ad (DU) is accessed (step F109).

If no data U-TOC is found, the controller 21 determines that no data file has been previously recorded and no data U-TOC has been produced, so that processing for the condition of "no file found" is carried out (steps F110 and F112).

If a data U-TOC is found at the address Ad (DU), the data U-TOC is read to obtain retrieval information for the data file to be played back using the directory and heading data stored therein (step F111).

If retrieval information for the requested data file is found, the address of the data file is accessed (steps F113 and F114) and the data file is read into the buffer RAM 33 (step F115). More specifically, an address of the head cluster of the data file to be reproduced is obtained from the directory information and the cluster linkage shown in the CAT is used to access the clusters containing the data file.

If retrieval information for the requested data file is not found, error processing is carried out (steps F113 and F112), such as providing an appropriate display to the user.

When the apparatus 10 is instructed to erase data, the controller 21 accesses the data U-TOC in the address AD (DU) (step F116).

If the data U-TOC is not found, error processing is carried out assuming no data file or data U-TOC has been previously recorded (steps F117 and F123), such as providing an appropriate display to the user.

If the data U-TOC is found at the address Ad (DU), the data U-TOC is read to obtain retrieval information for the data file to be erased using the directory and heading data stored therein (step F118).

If retrieval information for the specified data file is found, the directory entry in the data U-TOC is deleted (the bytes wherein the directory entry is recorded are marked as available for use) and the data U-TOC is otherwise suitably updated (steps F119 to F122).

If retrieval information for the specified data file is not found, error processing is implemented considering that there is no appropriate file (steps F119 and F123), such as providing an appropriate display to the user.

When the apparatus 10 is instructed to record data, the controller access the address AD (DU) (step F124).

If no data U-TOC is found (step F125), the disc is considered to be a disc on which neither a data file nor a data U-TOC has been previously recorded, although audio files may have been recorded on the disc. The audio U-TOC start address $UST_A$ is accessed (step F129), and then it is determined whether an audio U-TOC exists (step F130). If no audio U-TOC exists, the disc is considered to be a virgin disc on which neither audio nor non-audio data has been recorded, and the processor 21 calculates the recordable capacity of the disc, based on the P-TOC information, to obtain the capacity of the empty area (step F132). If the audio U-TOC exists, the processor 21 calculates the capacity of the empty area, shown as the regions NA1, D1, NA2, that is, the regions available for recording data and shown in FIG. 5, as indicated by the pointer P-FRA, shown in FIG. 7 (step F131).

After the capacity of the empty area has been determined, the processor 21 checks whether this capacity is sufficient for recording the data file to be recorded (step F134).

If the empty area is determined to be smaller than the volume of the data file to be recorded, error processing is carried out (step F135), such as providing an appropriate display to the user.

If the empty area has sufficient capacity to accommodate the data file to be recorded, then the data file is recorded in the empty area (step F136). The audio U-TOC and data U-TOC are suitably updated. Specifically, the updating includes modifying the list of free areas identified by the pointer P-FRA in the audio U-TOC. The area allotted for user data recording, for example, the area $D_1$ in FIG. 5, is updated by adjusting appropriate ones of the pointers P-TNO 1 through P-TNO 255 in the audio U-TOC. If no data U-TOC exists, a new data U-TOC is produced at the address Ad (DU) and updated (step F137).

If the data U-TOC is found at the address Ad (DU) (step F125), a size (volume) of the data file to be recorded is compared with the empty area EA in the data U-TOC to determine whether enough capacity exists in the area already allocated for user data (step F126).

If the empty area EA has sufficient capacity for the data file to be recorded, the data file is recorded in the empty area EA on the disc (step F127), the data U-TOC is suitably updated or initialized (step F128) and the processing is finished.

If the empty area EA has insufficient capacity for the data file to be recorded, the audio U-TOC is accessed to expand the area allocated for user data recording (step F133). Then, the new total empty area is compared with the size of the data file to be recorded (step F134), and the file is recorded (steps F136 to F137) or error processing is carried out (step F135), as described above.

All of the input/output means, that is, the data displaying means, data communicating means, image scanner means, key input means and means for converting from character data to displayable font, shown in FIGS. 1 and 2, are not necessarily provided in a recording or reproducing apparatus according to the present invention.

It will be appreciated that other data input/output means may be used in an apparatus according to the present invention.

An apparatus or recording medium according to the present invention may be used for recording and/or reproducing only user data, that is, not audio data. In this case, the input/output portions used exclusively for audio signals (the encoder 37, decoder 38, A/D converter 36, D/A converter 39, etc.) are unnecessary.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A recording apparatus for use with a recording medium for recording thereon first management information relating to a first type of information, second management information relating to a second type of information, said second type of information being different than said first type of information and one of said first and second types of information being user data, said apparatus comprising:

means for recording on said medium said first management information, said second management information and said first and second types of information in first, second and third areas, respectively, said means for recording being operative to record said user data and the management information for said user data in respective sectors on said recording medium, each of said sectors including category information; and control means for generating said first management information when said first type of information is recorded by said means for recording and for generating said second management information when said second type of information is recorded by said means for recording, said control means being operative to erase each of said sectors by setting its category information to a predetermined value.

2. The apparatus as in claim 1, wherein the user data is recorded in files having at least one sector, and said control means is operative to erase one of said files by setting the category information for the sectors in which said one file is recorded and the sectors in which the management information for said one file is recorded to said predetermined value.

3. The apparatus as in claim 1, wherein the management information for said user data includes allocation information identifying the usage of recordable portions of said recording medium, and said control means is also operative to update said allocation information when erasing at least one of said user data and the management information for said user data.

4. A method of recording on a recording medium first management information relating to a first type of information, second management information relating to a second type of information, said second type of information being different than said first type of information and one of said first and second types of information being user data, said method comprising the steps of:

recording on said medium said first management information, said second management information and said first and second types of information in first, second and third areas, respectively, said step of recording including recording said user data and the management information for said user data in respective sectors on said recording medium, each of said sectors including category information and being erasable by setting its category information to a predetermined value; and generating said first management information when said first type of information is recorded and generating said second management information when said second type of information is recorded.

5. The method as in claim 4, wherein said user data is recorded in files having at least one sector and further comprising the step of erasing one or more of said files by setting the category information for the sectors in which said one or more files are recorded and for the sectors in which the management information for said one or more files is recorded to said predetermined value.

6. The method as in claim 5, wherein the management information for said user data includes allocation information identifying the usage of recordable portions of said recording medium, and said erasing includes updating said allocation information when erasing at least one of said user data and the management information for said user data.

7. A recording apparatus for use with a recording medium for recording thereon first management information relating to a first type of information, second management information relating to a second type of information, said second type of information being different than said first type of information, said apparatus comprising:

means for recording on said medium said first management information, said second management information and said first and second types of information in first, second and third areas, respectively, and control means for generating said first management information when said first type of information is recorded by said means for recording and for generating said second management information when said second type of information is recorded by said means for recording.

8. The apparatus as in claim 7, wherein one of the first and second management information includes allocation information identifying usage of recordable portions of said recording medium, and said control means is operative to update said allocation information when recording at least one of said first and second types of information.

9. The apparatus as in claim 8, wherein said control means is operative to update said allocation information when recording each of said first and second types of information.

10. The apparatus as in claim 7, wherein said control means is operative to generate a first identification code as part of said first management information indicating said first type of information and to generate a second identification code as part of said second management information indicating said second type of information.

11. The apparatus as in claim 10, wherein one of said first and second identification codes is "MINX".

12. The apparatus as in claim 11, wherein the other of said first and second identification codes is "MINI".

13. The apparatus as in claim 7, wherein said first management information includes boundary information identifying at least one portion of said third area allocated for recording said second type of information, wherein said apparatus also includes means for receiving a file containing said second type of information, and wherein said control means is operative to determine whether said at least one portion of said third area has adequate capacity for recording said file.

14. The apparatus as in claim 13, wherein said control means is also operative to adjust said boundary information in said first management area so that said at least one portion, as adjusted, has adequate capacity for recording said file when said control means determines said at least one portion of said third area lacks adequate capacity for recording said file.

15. The apparatus as in claim 14, wherein said first management information includes a list of free areas on said recording medium, and said control means is also operative to adjust said list of free areas when adjusting said boundary information.

16. The apparatus as in claim 7, wherein one of said first and second types of information is user data.

17. The apparatus as in claim 16, wherein the other of said first and second types of information is audio data.

18. The apparatus as in claim 16, wherein the management information for user data includes reference information, and the control means is also operative to sample the user data to obtain the reference information.

19. The apparatus as in claim 16, wherein said means for recording is operative to record the user data and the management information for user data in respective sectors on said recording medium, each of said sectors including category information, and said control means is operative to erase said each of said sectors by setting its category information to a predetermined value.

20. The apparatus as in claim 19, wherein the user data is recorded in files having at least one sector, and said control means is operative to erase one of said files by setting the category information for the sectors in which the file is recorded and the sectors in which the management information for the file are recorded to said predetermined value.

21. The apparatus as in claim 19, wherein the management information for user data includes allocation information identifying the usage of recordable portions of said recording medium, and said control means is also operative to update said allocation information when erasing at least one of the user data and the management information for user data.

22. A method of recording for use with a recording medium for recording thereon first management information relating to a first type of information, second management information relating to a second type of information, said second type of information being different than said first type of information, said method comprising the steps of:

recording on said medium said first management information, said second management information and said first and second types of information in first, second and third areas, respectively, and generating said first management information when said first type of information is recorded by said means for recording and generating said second management information when said second type of information is recorded by said means for recording.

23. The method as in claim 22, wherein one of the first and second management information includes allocation information identifying usage of recordable portions of said recording medium, and further comprising the step of updating said allocation information when recording at least one of said first and second types of information.

24. The method as in claim 23, wherein said step of updating updates said allocation information when recording each of said first and second types of information.

25. The method as in claim 22, wherein the step of generating said first management information includes generating a first identification code indicating said first type of information; and the step of generating said second management information includes generating a second identification code indicating said second type of information.

26. The method as in claim 25, wherein one of said first and second identification codes is "MINX".

27. The method as in claim 26, wherein the other of said first and second identification codes is "MINI".

28. The method as in claim 22, wherein said first management information includes boundary information identifying at least one portion of said third area allocated for recording said second type of information, and further comprising the steps of receiving a file containing said second type of information, and determining whether said at least one portion of said third area has adequate capacity for recording said file.

29. The method as in claim 28, further comprising the step of adjusting said boundary information in said first management area so that said at least one portion, as adjusted, has adequate capacity for recording said file when said step of determining determines that said at least one portion of said third area lacks adequate capacity for recording said file.

30. The method as in claim 29, wherein said first management information includes a list of free areas on said recording medium, and further comprising the step of adjusting said list of free areas when adjusting said boundary information.

31. The method as in claim 22, wherein one of said first and second types of information is user data.

32. The method as in claim 31, wherein the other of said first and second types of information is audio data.

33. The method as in claim 31, wherein the management information for user data includes reference information, and further comprising the step of sampling the user data to obtain the reference information.

34. The method as in claim 31, wherein said step of recording records the user data and the management information for user data in respective sectors on said recording medium, each of said sectors including category information, and further comprising the step of erasing said each of said sectors by setting its category information to a predetermined value.

35. The method as in claim 34, wherein the user data is recorded in files having at least one sector, and the step of erasing one of said files includes setting the category information for the sectors in which the file is recorded and the sectors in which the management information for the file are recorded to said predetermined value.

36. The method as in claim 34, wherein the management information for user data includes allocation information identifying the usage of recordable portions of said recording medium, and said step of erasing includes updating said allocation information when erasing at least one of the user data and the management information for user data.

* * * * *